United States Patent
Yamakoshi et al.

(10) Patent No.: US 7,579,385 B1
(45) Date of Patent: Aug. 25, 2009

(54) DRIED POROUS CRUMBS OF HYDROGENATED BLOCK COPOLYMER

(75) Inventors: Yasumasa Yamakoshi, Tokyo (JP); Toshinori Shiraki, Tokyo (JP); Masami Kamaya, Yamato (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/446,314

(22) PCT Filed: Apr. 28, 1999

(86) PCT No.: PCT/JP99/02304

§ 371 (c)(1),
(2), (4) Date: Dec. 20, 1999

(87) PCT Pub. No.: WO99/55752

PCT Pub. Date: Nov. 4, 1999

(30) Foreign Application Priority Data

Apr. 28, 1998 (JP) ................................. 10-118626

(51) Int. Cl.
*C08F 8/04* (2006.01)
*C08J 9/00* (2006.01)

(52) U.S. Cl. ............................ 521/62; 521/64; 521/142; 521/146; 521/148; 525/98; 525/316; 528/480; 528/500

(58) Field of Classification Search ................. 525/315, 525/316, 98; 521/50–189; 528/480, 500
See application file for complete search history.

(56) References Cited

U.S. PATENT DOCUMENTS

| | | | |
|---|---|---|---|
| 2,905,658 A | 9/1959 | Dietz | |
| 3,968,003 A | 7/1976 | Wolfe | |
| 4,423,207 A | * 12/1983 | Flock et al. | ........... 528/499 |
| 5,616,652 A | 4/1997 | Kusano et al. | |

FOREIGN PATENT DOCUMENTS

| | | |
|---|---|---|
| EP | 0497411 A1 | 8/1992 |
| EP | 0731111 A2 | 9/1996 |
| JP | 554845 B2 | 8/1993 |
| JP | 713091 B2 | 2/1995 |
| JP | 8301929 A | 11/1996 |
| JP | A8301929 | 11/1996 |
| JP | 1017611 A | 1/1998 |
| JP | A1017611 | 1/1998 |

OTHER PUBLICATIONS

Encyclopedia of Chemical Technology, Centrifugal Separation, John Wiley & Sons, vol. 5, pp. 505-551.*
English language abstract of JP 61 108607 A (May 27, 1986).

* cited by examiner

*Primary Examiner*—Irina S Zemel
(74) *Attorney, Agent, or Firm*—Birch, Stewart, Kolasch & Birch, LLP

(57) ABSTRACT

Disclosed are dried porous crumbs of a hydrogenated block copolymer which is obtained by hydrogenating a block copolymer comprising (a) at least one polymer block composed mainly of aromatic vinyl monomer units and (b) at least one polymer block composed mainly of conjugated diene monomer units, and which has a molecular weight of 70,000 or more. The dried porous crumbs have a water content of 1% by weight or less and having the capability of absorbing an oil in an amount of 1.0 or more, in terms of the ratio of the weight of an oil, which is absorbed by the dried porous crumbs when the dried porous crumbs are immersed in the oil at 25° C. under atmospheric pressure for 1 minute, to the weight of the dried porous crumbs. Also disclosed is a method for producing the same. When the dried porous crumbs are used as a modifier in the production of a molding resin composition from a thermoplastic resin and a liquid additive, such as a softening agent or a silicone oil, a shaped article having an excellent appearance can be produced by molding the molding resin composition.

10 Claims, 3 Drawing Sheets

DRIED POROUS CRUMBS OF HYDROGENATED BLOCK COPOLYMER

This application is the national phase under 35 U.S.C. §371 of PCT International Application No. PCT/JP99/02304 which has an International filing date of Apr. 28, 1999 which designated the United States of America.

BACKGROUND OF THE INVENTION

1. Field of the Invention

The present invention relates to dried porous crumbs of a hydrogenated block copolymer. More particularly, the present invention is concerned with dried porous crumbs of a hydrogenated block copolymer which is obtained by hydrogenating a block copolymer comprising (a) at least one polymer block composed mainly of aromatic vinyl monomer units and (b) at least one polymer block composed mainly of conjugated diene monomer units, which hydrogenated block copolymer has a molecular weight of 70,000 or more, wherein the dried porous crumbs have a water content of 1% by weight or less and have the capability of absorbing an oil in an amount of 1.0 or more, in terms of the ratio of the weight of an oil, which is absorbed by the dried porous crumbs when the dried porous crumbs are immersed in the oil at 25° C. under atmospheric pressure for 1 minute, to the weight of the dried porous crumbs. The dried porous crumbs of the present invention have not only a low water content, but also an advantageously high oil-absorbing capability, so that the dried porous crumbs can quickly absorb a satisfactory amount of a liquid additive, such as a softening agent or a silicone oil. Therefore, by using the dried porous crumbs of the present invention as a modifier when a molding resin composition is produced from a thermoplastic resin and a liquid additive, such as a softening agent or a silicone oil, a shaped article having an excellent appearance can be produced by molding. The present invention is also concerned with a method for producing, with effectiveness and efficiency, the dried porous crumbs having not only a low water content, but also an advantageously high oil-absorbing capability.

2. Prior Art

A block copolymer composed of a conjugated diene and an aromatic vinyl compound (hereinafter, the block copolymer is frequently referred to as a "conjugated diene/aromatic vinyl compound block copolymer") has various excellent properties, and exhibits different characteristics depending on the composition thereof. Therefore, a conjugated diene/aromatic vinyl compound block copolymer is used in various application fields. For example, with respect to a conjugated diene/aromatic vinyl compound block copolymer having a relatively low content of an aromatic vinyl compound, even if the block copolymer is not vulcanized, such a block copolymer exhibits high elasticity at room temperature, which is comparable to that of a vulcanized natural rubber or a vulcanized synthetic rubber. Such a block copolymer also exhibits excellent processability at high temperature, which is comparable to that of a thermoplastic resin. Therefore, a conjugated diene/aromatic vinyl compound block copolymer having a relatively low content of an aromatic vinyl compound is widely used in various application fields, such as foot wear, modifiers for plastics, modifiers for asphalt, and adhesives. On the other hand, a conjugated diene/aromatic vinyl compound block copolymer having a relatively high content of an aromatic vinyl compound is a transparent thermoplastic resin having an excellent impact resistance, and is widely used in various application fields, such as packaging containers for food, household articles, wrapping materials for parts for household electric appliances or other industrial products, and toys. Further, a hydrogenation product of the above-mentioned block copolymer has not only the above-mentioned properties, but also excellent weathering resistance and heat resistance. Therefore, such a hydrogenation product is widely used not only in the application fields mentioned above in connection with the non-hydrogenated conjugated diene/aromatic vinyl compound block copolymer, but also in other application fields, such as automobile parts and medical equipment.

In general, the polymerization for producing a conjugated diene/aromatic vinyl compound block copolymer and the hydrogenation of the block copolymer are performed in a hydrocarbon solvent inert to a polymerization catalyst and a hydrogenation catalyst, so that each of the block copolymer and the hydrogenation product thereof is obtained in the form of a uniform solution thereof or a uniform suspension thereof in the solvent. Therefore, the obtained block copolymer and the obtained hydrogenation product need to be separated and re-covered from the solvent used. With respect to the method for separating a block copolymer or a hydrogenation product thereof from a solvent, various methods are known. As an example of such methods, there is known a method called a "steam stripping method", which comprises adding to hot water a solution or suspension of a block copolymer or a hydrogenation product thereof in a solvent, and distilling off from the resultant mixture the solvent together with water (in the form of steam) to thereby obtain an aqueous slurry containing wet porous crumbs of a block copolymer or a hydrogenation product thereof. With respect to the steam stripping method, reference can be made to, for example, Unexamined Japanese Patent Application Laid-Open Specification No. 8-301929 (corresponding to U.S. Pat. No. 5,616,652).

For obtaining dried porous crumbs from the aqueous slurry containing the wet porous crumbs obtained by the above-mentioned method, it is necessary to remove water from the above-mentioned wet crumbs by dehydration and drying. As a method for dehydration and drying, for example, there is known a method described in Examined Japanese Patent Application Publication No. 7-13091.

The dehydration of water-containing porous crumbs is generally conducted by a mechanical compression method using a roll type or a Banbury type dehydrator, a screw extruder type compression dehydrator or the like. The drying of the water-containing porous crumbs is generally conducted by a mechanical compression method using a screw extruder type dryer, a kneader type dryer, an expander dryer or the like. Further, it is also conducted to dry the water-containing porous crumbs by a method using a hot-air dryer in combination with any one of the above-mentioned dryers used for a mechanical compression method.

The thus obtained dried porous crumbs have the capability of absorbing a liquid additive and the like and, therefore, the dried porous crumbs can be advantageously used, for example, as a modifier when a molding resin composition is produced from a thermoplastic resin and a liquid additive.

However, the above-described conventional technique for producing dried porous crumbs has a problem in that not only is the productivity low, but also the produced dried porous crumbs cannot absorb a satisfactory amount of an oil, so that even when the dried porous crumbs are used as a modifier for producing a molding resin composition from a thermoplastic resin and an additive, especially a liquid softening agent or plasticizer (e.g., an oil), it is impossible to efficiently produce a shaped article having an excellent appearance. Accordingly, it has been desired to solve the above-mentioned problem in various fields in which such additive-containing molding resin compositions are used.

SUMMARY OF THE INVENTION

In this situation, the present inventors have made extensive and intensive studies in order to solve the problems accompanying the conventional techniques. As a result, it has surprisingly been found that the below-described specific method enables the production of dried porous crumbs of a hydrogenated block copolymer, which have not only a low water content, but also an advantageously high capability of absorbing an oil. The above-mentioned specific method comprises providing an organic solvent solution of a hydrogenated block copolymer which is obtained by hydrogenating a block copolymer comprising (a) at least one polymer block composed mainly of aromatic vinyl monomer units and (b) at least one polymer block composed mainly of conjugated diene monomer units, the hydrogenated block copolymer having a molecular weight of 70,000 or more; removing the organic solvent from the solution by steam stripping, thereby obtaining an aqueous slurry containing wet porous crumbs of the hydrogenated block copolymer; subjecting the aqueous slurry to gravity dehydration, centrifugation dehydration or filtration dehydration to remove water from the slurry, thereby obtaining a dehydrated wet porous crumbs; and drying, under specific temperature conditions, the obtained dehydrated wet porous crumbs in a hot-air dryer having a thermal conduction type heating means or having no thermal conduction type heating means. Based on this finding, the present invention has been completed.

Accordingly, it is a primary object of the present invention to provide dried porous crumbs which have not only a low water content, but also an advantageously high capability of absorbing an oil, and hence can be advantageously used as a modifier when a molding resin composition is produced from a thermoplastic resin and a liquid additive, such as a softening agent or a silicone oil.

It is another object of the present invention to provide a method for producing, with effectiveness and efficiency, the above-mentioned dried porous crumbs.

The foregoing and other objects, features and advantages of the present invention will be apparent from the following detailed description taken in connection with the attached drawings, and appended claims.

BRIEF DESCRIPTION OF THE DRAWINGS

In the drawings:

In FIGS. 1 to 3, like parts or portions are indicated by like reference numerals.

DESCRIPTION OF REFERENCE NUMERALS

Figure 1:
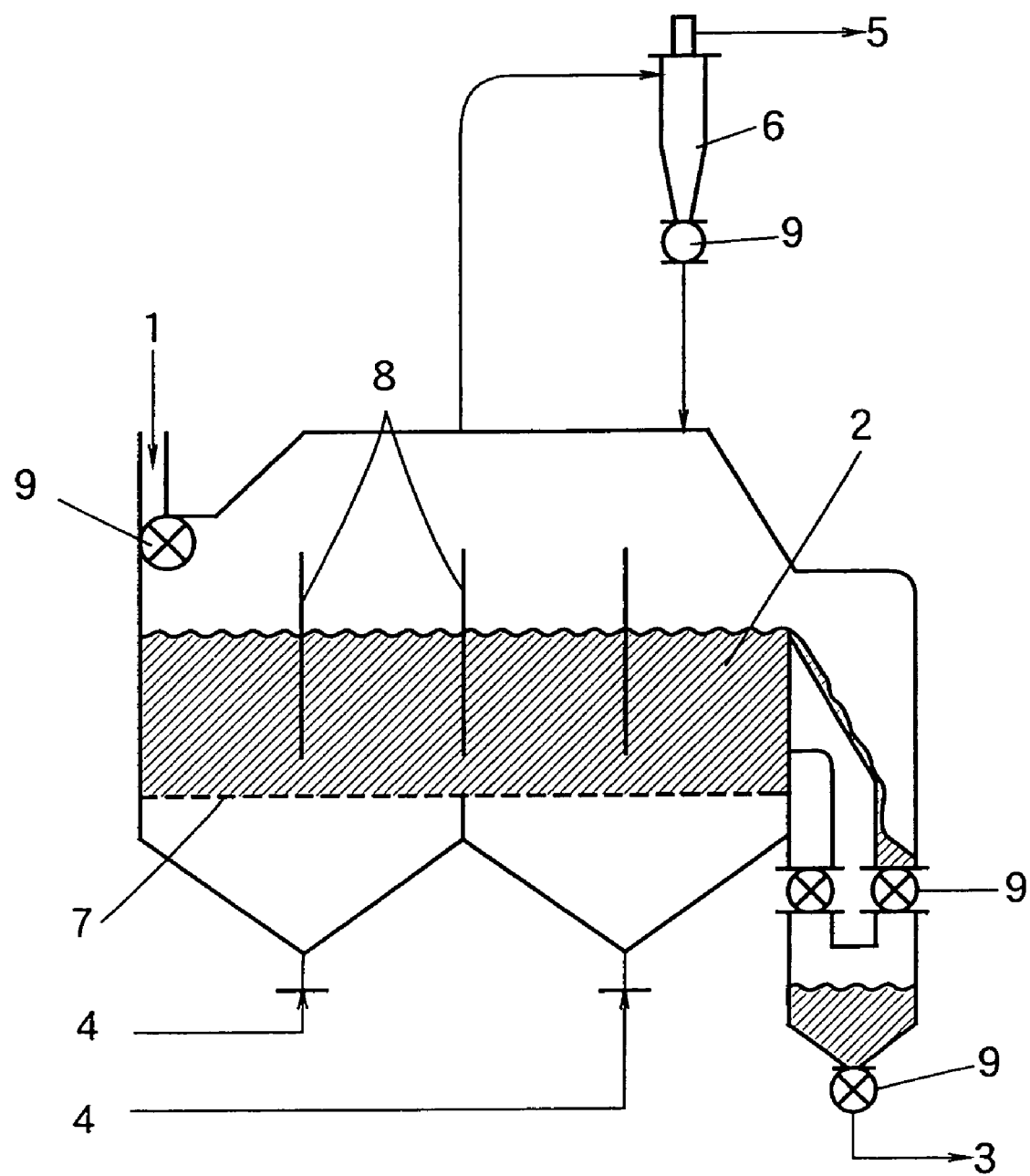
FIG. 1 is a diagram showing one mode of the method for drying the dehydrated wet porous crumbs, which is conducted in Examples 1, 5, 6 and 9 using a horizontal continuous fluidized bed dryer having no thermal conduction type heating means.

1: Dehydrated wet porous crumbs
2: Crumbs fluidized by hot air
3: Dried porous crumbs
4: Hot air
5: Discharged air
6: Cyclone
7: Perforated plate
8: Partition plate
9: Rotary valve
10: Thermal conduction type heating means
11: Steam for heating
12: Tube for circulation of steam 11
13: Agitation shaft
14: Agitation blade
15: Motor
16: Screw feeder

DETAILED DESCRIPTION OF THE INVENTION

According to the present invention, there is provided dried porous crumbs of a hydrogenated block copolymer which is obtained by hydrogenating a block copolymer comprising (a) at least one polymer block composed mainly of aromatic vinyl monomer units and (b) at least one polymer block composed mainly of conjugated diene monomer units, the hydrogenated block copolymer having a molecular weight of 70,000 or more, the dried porous crumbs having a water content of 1% by weight or less and having the capability of absorbing an oil in an amount of 1.0 or more, in terms of the ratio of the weight of an oil, which is absorbed by the dried porous crumbs when the dried porous crumbs are immersed in the oil at 25° C. under atmospheric pressure for 1 minute, to the weight of the dried porous crumbs.

For easy understanding of the present invention, the essential features and various preferred embodiments of the present invention are enumerated below.

1. Dried porous crumbs of a hydrogenated block copolymer which is obtained by hydrogenating a block copolymer comprising (a) at least one polymer block composed mainly of aromatic vinyl monomer units and (b) at least one polymer block composed mainly of conjugated diene monomer units, the hydrogenated block copolymer having a molecular weight of 70,000 or more, the dried porous crumbs having a water content of 1% by weight or less and having the capability of absorbing an oil in an amount of 1.0 or more, in terms of the ratio of the weight of an oil, which is absorbed by the dried porous crumbs when the dried porous crumbs are immersed in the oil at 25° C. under atmospheric pressure for 1 minute, to the weight of the dried porous crumbs.

2. A method for producing dried porous crumbs of a hydrogenated block copolymer, the dried porous crumbs having a water content of 1% by weight or less, which comprises the steps of:

(1) providing an organic solvent solution of a hydrogenated block copolymer which is obtained by hydrogenating a block copolymer comprising (a) at least one polymer block composed mainly of aromatic vinyl monomer units and (b) at least one polymer block composed mainly of conjugated diene monomer units, the hydrogenated block copolymer having a molecular weight of 70,000 or more, (2) removing the organic solvent from the solution by steam stripping, thereby obtaining an aqueous slurry containing wet porous crumbs of the hydrogenated block copolymer, (3) subjecting the aqueous slurry to gravity dehydration, centrifugation dehydration or filtration dehydration to remove water from the slurry, thereby dehydrating the wet porous crumbs to an extent that the water content of the wet porous crumbs is in the range of from greater than 20% to 90% by weight, and (4) exposing the resultant dehydrated wet porous crumbs to hot air in a hot-air dryer having a thermal conduction type heating means or having no thermal conduction type heating means, to thereby dry the dehydrated wet porous crumbs, wherein the temperature of the hot air in the hot-air dryer satisfies the following relationship:

$$80 \leq t_1 \leq 1.5 \times Mw/10^4 + 155,$$

wherein $t_1$ represents the temperature (° C.) of the hot air in the hot-air dryer and Mw represents the molecular weight of the hydrogenated block copolymer, and wherein when the hot-air dryer has a thermal conduction type heating means, the temperature of the thermal conduction type heating means satisfies the following relationship:

$$t_2 \leq 1.5 \times Mw/10^4 + 135,$$

wherein $t_2$ represents the temperature (° C.) of the thermal conduction type heating means and Mw is as defined above.

3. The method according to item 2 above, wherein the wet porous crumbs obtained in step (2) above have a particle size distribution wherein the amount of those crumbs which do not pass through a 2-mesh screen is 40% by weight or less, based on the weight of the total mass of the wet porous crumbs, the amount of those crumbs which pass through a 30-mesh screen and do not pass through a 42-mesh screen is 50% by weight or less, based on the weight of the total mass of the wet porous crumbs, and the amount of those crumbs which pass through a 42-mesh screen is 0.1% by weight or less, based on the weight of the total mass of the wet porous crumbs.

4. The method according to item 2 or 3 above, wherein the dehydrated wet porous crumbs obtained in step (3) above have a particle size distribution wherein the amount of those crumbs which pass through a 6-mesh screen and do not pass through a 42-mesh screen is 50% by weight or more, based on the weight of the total mass of the dehydrated wet porous crumbs.

5. The method according to item 4, wherein the dehydrated wet porous crumbs obtained in step (3) above have a particle size distribution wherein the particle sizes of all of the dehydrated wet porous crumbs are within the range of from 50 to 150% of the average particle size of the dehydrated wet porous crumbs.

6. The method according to any one of items 2 to 5 above, wherein the hydrogenated block copolymer has a molecular weight of from 90,000 to 800,000.

7. The method according to any one of items 2 to 5 above, wherein the hydrogenated block copolymer has a molecular weight of from 200,000 to 800,000.

In the present invention, the monomer units of the polymer are named in accordance with a nomenclature wherein the names of the original monomers from which the monomer units are derived are used with the term "unit" attached thereto. For example, the term "aromatic vinyl monomer unit" means a monomer unit which is formed in a polymer obtained by the polymerization of the aromatic vinyl monomer. Similarly, the term "conjugated diene monomer unit" means a monomer unit which is formed in a polymer obtained by the polymerization of the conjugated diene monomer.

The hydrogenated block copolymer used in the dried porous crumbs of the present invention is a hydrogenated block copolymer having a molecular weight of 70,000 or more, which is obtained by hydrogenating a block copolymer comprising (a) at least one polymer block composed mainly of aromatic vinyl monomer units and (b) at least one polymer block composed mainly of conjugated diene monomer units.

With respect to the above-mentioned block copolymer, there is no particular limitation, and conventional block copolymers can be used as long as they are block copolymers containing the above-mentioned polymer blocks (a) and (b). However, generally, it is preferred to use a block copolymer having an aromatic vinyl monomer unit content in the range of from 5 to 95% by weight, more advantageously from 10 to 90% by weight. When the aromatic vinyl monomer unit content of the block copolymer is 60% by weight or less, especially 55% by weight or less, the block copolymer exhibits properties similar to those of a thermoplastic elastomer. On the other hand, when the aromatic vinyl monomer unit content of the block copolymer is more than 60% by weight, especially 65% by weight or more, the block copolymer exhibits properties similar to those of a thermoplastic resin.

In the present invention, the above-mentioned polymer block (a) may be a homopolymer block composed only of at least one aromatic vinyl monomer unit, or may be a copolymer block containing aromatic vinyl monomer units and conjugated diene monomer units. When polymer block (a) is the above-mentioned copolymer block, polymer block (a) generally has an aromatic vinyl monomer unit content of 50% by weight or more, preferably 70% by weight or more. Similarly, the above-mentioned polymer block (b) may be a homopolymer block composed only of at least one conjugated diene monomer unit, or may be a copolymer block containing conjugated diene monomer units and aromatic vinyl monomer units. When polymer block (b) is the above-mentioned copolymer block, polymer block (b) generally has a conjugated diene monomer unit content of more than 50% by weight, preferably 70% by weight or more. When polymer block(s) (a) and/or (b) are/is the above-mentioned copolymer block(s), there is no particular limitation with respect to the polymer structure of polymer block(s) (a) and/or (b), and the aromatic vinyl monomer units and the conjugated diene monomer units may be uniformly dispersed or may be dispersed in a tapered configuration in polymer block(s) (a) and/or (b). The block copolymer used in the present invention may have a plurality of the copolymer blocks in which the aromatic vinyl monomer units or the conjugated diene monomer units are uniformly dispersed and/or a plurality of the copolymer blocks in which the aromatic vinyl monomer units or the conjugated diene monomer units are dispersed in a tapered configuration. However, when two adjacent copolymer blocks are present in the block copolymer, the mutually adjacent copolymer blocks need to have clearly different compositions and different manners of dispersion of the aromatic vinyl monomer units or the conjugated diene monomer units. The block copolymer used in the present invention may be a mixture of block copolymers having different compositions.

As an example of the method for producing the block copolymer used in the present invention, there can be mentioned a method which is disclosed in Examined Japanese Patent Application Publication No. 59-166518 (corresponding to U.S. Pat. No. 4,603,155). By such a conventional method, there can be produced block copolymers represented by the following formulae:

$(A-B)_n, A-(B-A)_n, B-(A-B)_n,$ wherein A represents a polymer block (a) composed mainly of aromatic vinyl monomer units, B represents a polymer block (b) composed mainly of conjugated diene monomer units, and n represents an integer of 1 or more, generally from 1 to 5; and $[(B-A)_n]_m-X,$ $[(A-B)_n]_m-X,$ $[(B-A)_n-B]_m-X,$ and $[(A-B)_n-A]_m-X,$ wherein A, B and n are as defined above; X represents a residue of a coupling reagent, such as silicon tetrachloride, tin tetrachloride, an epoxidized soybean oil, a compound having 2 to 6 functional epoxy groups, a polyhalide of a hydrocarbon, a carboxylic ester or a polyvinyl compound (e.g., divinylbenzene), or a residue of a polymerization initiator, such as an organolithium compound; and m represents an integer of 1 or more, generally 1 to 10.

In the present invention, the microstructure of the conjugated diene monomer units of the block copolymer (i.e., the cis bond/trans bond/vinyl bond ratio) can be appropriately controlled using a polar compound described below or the like. For example, when 1,3-butadiene is used for forming the conjugated diene monomer units of the block copolymer, the 1,2-vinyl bond content of the conjugated diene monomer units is generally in the range of from 5 to 90%. However, it is preferred that the 1,2-vinyl bond content is adjusted to a level of from 10 to 80%, more advantageously in the range of from 25 to 75%. Alternatively, when isoprene is used for forming the conjugated diene monomer units of the block copolymer, the 3,4-vinyl bond content of the conjugated diene monomer units is generally in the range of from 3 to 80%. However, it is preferred that the 3,4-vinyl bond content is adjusted to a level of from 5 to 70%.

Further, for obtaining a shaped article having an excellent appearance by the use of a molding resin composition produced by adding a mixture of the dried porous crumbs of the present invention and a liquid additive (such as an oil functioning as a softening agent or a plasticizer) to a thermoplastic resin, it is preferred that the conjugated diene monomer units of the block copolymer have a vinyl bond content in the following ranges. When 1,3-butadiene is used for forming the conjugated diene monomer units of the block copolymer, it is preferred that the conjugated diene monomer units have a 1,2-vinyl bond content in the range of from 25 to 75%. When isoprene is used for forming the conjugated diene monomer units of the block copolymer, it is preferred that the conjugated diene monomer units have a 3,4-vinyl bond content in the range of from 5 to 70%. When 1,3-butadiene and isoprene are used for forming conjugated diene monomer units, it is preferred that the conjugated diene monomer units have a vinyl bond content (the total content of the 1,2-vinyl bond and the 3,4-vinyl bond) in the range of from 8 to 70%.

Examples of conjugated dienes used for producing the block copolymer include 1,3-butadiene, 2-methyl-1,3-butadiene (isoprene), 2,3-dimethyl-1,3-butadiene, 1,3-pentadiene and 1,3-hexadiene. Of these, 1,3-butadiene and isoprene are preferred. These conjugated dienes can be used individually or in combination.

Examples of aromatic vinyl compounds used for producing the block copolymer include styrene, o-methylstyrene, p-methylstyrene, p-tert-butylstyrene, 2,4-dimethylstyrene, α-methylstyrene, vinylnaphthalene, vinylanthracene, o-chlorostyrene, p-chlorostyrene, 2,4-dichlorostyrene, o-bromostyrene, p-bromostyrene and p-methoxystyrene. Of these, styrene is preferred. These aromatic vinyl compounds can be used individually or in combination.

As a solvent used for producing the block copolymer, an organic solvent can be used. Examples of organic solvents include aliphatic compounds, such as butane, pentane, hexane, isopentane, heptane, octane and isooctane; alicyclic hydrocarbons, such as cyclopentane, methylcyclopentane, cyclohexane, methylcyclohexane and ethylcyclohexane; and aromatic hydrocarbons, such as benzene, toluene, ethylbenzene and xylene. These organic solvents can be used individually or in combination.

As a catalyst used for producing the block copolymer, an organolithium compound can be used. The term "organolithium compound" means an organic compound having in a molecule thereof at least one lithium atom. Examples of organolithium compounds include ethyllithium, n-propyllithium, isopropyllithium, n-butyllithium, sec-butyllithium, tert-butyllithium, hexamethylenedilithium, butadienyldilithium and isoprenyldilithium. These organolithium compounds can be used individually or in combination. When an organolithium compound is used as a catalyst for producing the block copolymer, the organolithium compound may be stepwise added to the polymerization reaction system once or more in the course of polymerization.

In the production of the block copolymer, a polar compound or a randomizing agent can be used for various purposes, such as the control of the polymerization rate, the control of the microstructure of the conjugated diene monomer units of the block copolymer, and the control of the ratio of the conjugated diene monomer units to the aromatic vinyl monomer units in the block copolymer. Examples of polar compounds and randomizing agents include ethers, amines, thioethers, phosphines, phosphoramides, a potassium or sodium salt of alkylbenzenesulfonic acid, and a potassium or sodium alkoxide. Preferred examples of ethers include dimethyl ether, diethyl ether, diphenyl ether, tetrahydrofuran, diethylene glycol dimethyl ether and diethylene glycol dibutyl ether. Preferred examples of amines include tertiary amines, such as trimethylamine, triethylamine and tetramethylethylenediamine, and cyclic tertiary amines. Preferred examples of phosphines and phosphoramides include triphenylphosphine and hexamethylphosphoramide.

With respect to the polymerization reaction conditions in the production of the block copolymer, an explanation is made below. The polymerization reaction temperature is generally in the range of from −10 to 150° C., preferably in the range of from 30 to 120° C. The polymerization reaction time varies depending on other polymerization reaction conditions and the like; however, the polymerization reaction time is generally 48 hours or less, preferably in the range of from 0.5 to 10 hours. It is preferred that the polymerization reaction is performed in an atmosphere of inert gas, such as nitrogen gas. With respect to the polymerization reaction pressure, there is no particular limitation as long as the pressure is sufficient to maintain the monomers and the solvent in a liquid state at a polymerization reaction temperature employed. Further, care must be taken so as to prevent impurities (such as water, oxygen and carbon dioxide gas), which are likely to deactivate not only the polymerization catalyst but also a living polymer being formed, from intruding into the polymerization reaction system.

In the present invention, a terminal-modified block copolymer in which a polar group-containing group is bonded to at least one terminal of the polymer chain can be used. As an example of polar group-containing groups, there can be mentioned a group containing at least one polar group selected from the group consisting of a hydroxyl group, an aldehyde group, a thioaldehyde group, a carbonyl group, a thiocarbonyl group, an acid halide group, an acid anhydride group, a carboxyl group, a thiocarboxyl group, a carboxylic ester group, an amide group, a sulfonic acid group, a sulfonic ester group, a phosphoric acid group, a phosphoric ester group, an amino group, an imino group, a nitrile group, a pyridyl group, a quinolyl group, an epoxy group, a thioepoxy group, a sulfide group, an isocyanate group, an isothiocyanate group, a silicon halide group, an alkoxysilicon group, a tin halide group, an alkoxystannyl group and a phenylstannyl group. As a specific example of the terminal-modified block copolymer, there can be mentioned a terminal-modified block copolymer described in Examined Japanese Patent Application Publication No. 4-28034 (corresponding to U.S. Pat. No. 5,115,035).

In the present invention, the hydrogenated block copolymer used in the dried porous crumbs of the pre-sent invention can be obtained by subjecting the above-mentioned block copolymer to hydrogenation, thereby partially hydrogenating the double bonds in the conjugated diene monomer units of the block copolymer or selectively hydrogenating the vinyl groups in the aromatic vinyl monomer units of the block copolymer. As a catalyst for the hydrogenation of the block copolymer, a conventional catalyst can be used. Examples of such conventional catalysts include: (1) carrier-supported, heterogeneous catalysts, such as a catalyst comprising a metal (such as Ni, Pt, Pd or Ru) supported on a carrier (such as carbon, silica, alumina or diatomaceous earth); (2) so-called Ziegler type catalysts, such as a catalyst comprising an transition metal salt (such as an organic acid salt or acetylaceton salt of Ni, Co, Fe or Cr) and a reducing agent (such as an organoaluminum compound); and (3) homogeneous catalysts, such as organometallic complexes (e.g., an organometallic compound containing a metal, such as Ti, Ru, Rh or Zr).

As a specific example of the method for the hydrogenation, there can be mentioned a method described in Examined Japanese Patent Application Publication No. 63-4841 (corresponding to U.S. Pat. No. 4,673,714), in which the hydrogenation is performed in a hydrocarbon solvent in the presence of a hydrogenation catalyst. With respect to the degree of hydrogenation of the hydrogenated block copolymer used in the dried porous crumbs of the present invention, the desired degree of hydrogenation can be achieved by controlling the reaction temperature for the hydrogenation, the reaction time for the hydrogenation, the amount of hydrogen used, the amount of a catalyst used and the like. With respect to the degree of hydrogenation of the block copolymer, the degree of hydrogenation of the double bonds in the conjugated diene monomer units is generally 50% or more, preferably 80% or more, more preferably 90% or more. When a block copolymer having a low hydrogenation degree is used in a molding composition, disadvantages are likely to be caused such that, during the molding of a molding resin composition containing the dried porous crumbs of the block copolymer, the dried porous crumbs deteriorate by heat, and that the compatibility of the dried porous crumbs with other resins used in the molding resin composition becomes poor. For obtaining a shaped article having excellent weathering resistance and heat resistance by the use of the above-mentioned molding resin composition, it is preferred that the above-mentioned hydrogenation degree of the double bonds is as high as possible. With respect to the degree of hydrogenation of the aromatic double bonds in the aromatic vinyl monomer units of the block copolymer, there is no particular limitation; however, the degree of hydrogenation is preferably 50% or less, more preferably 30% or less, still more preferably 20% or less. The degree of hydrogenation can be measured by means of an infrared spectrophotometer, a nuclear magnetic resonance (NMR) apparatus or the like.

In the present invention, the term "molecular weight" of a hydrogenated block copolymer means a peak molecular weight of the hydrogenated block copolymer as measured by gel permeation chromatography (GPC) using a calibration curve obtained using the peak molecular weights of the standard polystyrene samples.

In the present invention, it is required that the molecular weight of the hydrogenated block copolymer used in the dried porous crumbs be 70,000 or more. From the viewpoint of the productivity of the dried porous crumbs and the balance of the moldability of a molding resin composition containing the dried porous crumbs and the properties of a shaped article obtained from the molding resin composition, the molecular weight of the hydrogenated block copolymer is generally in the range of from 70,000 to 1,000,000, preferably in the range of from 90,000 to 800,000, more preferably in the range of from 200,000 to 800,000. When the molecular weight of the hydrogenated block copolymer is in the above-mentioned range, a shaped article obtained from the molding resin composition containing the dried-porous crumbs exhibits excellent tensile strength, excellent compressive strain resistance and the like, so that the molding resin composition can be advantageously used for producing parts for an automobile, an industrial purpose product, medical equipment and the like. When the molecular weight of the hydrogenated block copolymer is less than 70,000, disadvantages are caused wherein, in the below-described drying step of the method for producing the dried porous crumbs, the hydrogenated block copolymer is likely to adhere to the inner wall of a hot-air dryer used in the drying step and, hence, the continuous operation of the hot-air dryer cannot be conducted for a prolonged period of time, so that the commercial-scale production of the dried porous crumbs becomes difficult. When the molecular weight of the hydrogenated block copolymer is more than 1,000,000, a disadvantage is likely to be caused wherein the moldability of a molding resin composition containing dried porous crumbs produced from a hydrogenated block copolymer having such a high molecular weight becomes poor.

In the present invention, it is preferred that the sizes of the pores of the dried porous crumbs are within the range of from 1.8 to 57 µm, and that the average pore-size of the dried porous crumbs is within the range of from 3 to 20 µm. Further, the total volume of the pores having a size within the range of from 1.8 to 57 µm is preferably 300 mm$^3$/g or more, more preferably 330 mm$^3$/g or more, still more preferably 350 mm$^3$/g or more. The above-mentioned pore size, average pore size and pore volume can be measured by means of a mercury porosimeter.

In the present invention, it is required that the dried porous crumbs have a water content of 1% by weight or less. When the water content of the dried porous crumbs exceeds 1% by weight, disadvantageous phenomena, such as foaming, occur during the molding of a molding resin composition containing the dried porous crumbs.

In the present invention, it is required that the dried porous crumbs have the capability of absorbing an oil in an amount of 1.0 or more, in terms of the ratio of the weight of an oil, which is absorbed by the dried porous crumbs when the dried porous crumbs are immersed in the oil at 25° C. under atmospheric pressure for 1 minute, to the weight of the dried porous crumbs (such capability is hereinafter, frequently referred to as the "oil-absorbing capability"). When the dried porous crumbs have the oil-absorbing capability of less than 1.0, disadvantages are caused wherein, even when the dried porous crumbs are used in a molding resin composition containing various additives, especially a liquid additive, such as an oil serving as a softening agent or a plasticizer, it is difficult to satisfactorily disperse the additives in the molding resin composition, so that the molding resin composition cannot be used for effectively producing a shaped article having an excellent appearance. The above-mentioned oil-absorbing capability can be measured by the following method. 10 g of dried porous crumbs is charged into a 200-mesh wire net pouch, and the pouch containing the crumbs is immersed at 25° C. under atmospheric pressure in a large amount (1 litter or more) of a paraffin process oil (e.g., Diana Process Oil, Type PW-90, manufactured and sold by Idemitsu Petrochemical Co., Ltd., Japan; kinetic viscosity at 40° C.=95.54 mm$^2$/s) so that the all of the dried porous crumbs are immersed in the oil. After the crumbs are immersed in the oil for 1 minute, the crumbs are immediately taken out from the oil, and introduced into a centrifugal separator and treated under 1,000 G for 3 minutes, to thereby separate the oil adhering to the crumbs from the crumbs. Then, the crumbs are taken out from the centrifugal separator, and the weight of the crumbs is measured. The oil-absorbing capability of the dried porous crumbs is calculated by the following formula:

Oil-absorbing capability={(the weight of the oil-containing porous crumbs after the centrifugation)−(the weight of the dried porous crumbs before the immersion in the oil)}/(the weight of the dried porous crumbs before the immersion in the oil).

The above-mentioned oil-absorbing capability of the dried porous crumbs of the present invention is preferably 1.05 or more, more preferably 1.1 or more.

It is preferred that the dried porous crumbs of the present invention have a particle size distribution wherein the amount of those crumbs which pass through a 6-mesh screen and do not pass through a 42-mesh screen is 50% by weight or more, more advantageously 70% by weight or more, still more advantageously 80% by weight or more, based on the weight of the total mass of the dried porous crumbs, and wherein the particle sizes of all of the dried porous crumbs are within the range of from 50 to 150% of the average particle size of the dried porous crumbs.

Hereinbelow, a detailed explanation is made with respect to the method for producing the dried porous crumbs of the present invention. The dried porous crumbs of the present invention can be effectively and efficiently produced by a method comprising the steps of:

(1) providing an organic solvent solution of a hydrogenated block copolymer which is obtained by hydrogenating a block copolymer comprising (a) at least one polymer block composed mainly of aromatic vinyl monomer units and (b) at least one polymer block composed mainly of conjugated diene monomer units, the hydrogenated block copolymer having a molecular weight of 70,000 or more, (2) removing the organic solvent from the solution by steam stripping, thereby obtaining an aqueous slurry containing wet porous crumbs of the hydrogenated block copolymer, (3) subjecting the aqueous slurry to gravity dehydration, centrifugation dehydration or filtration dehydration to remove water from the slurry, thereby dehydrating the wet porous crumbs to an extent that the water content of the wet porous crumbs is in the range of from greater than 20% to 90% by weight, and (4) exposing the resultant dehydrated wet porous crumbs to hot air in a hot-air dryer having a thermal conduction type heating means or having no thermal conduction type heating means, to thereby dry the dehydrated wet porous crumbs, wherein the temperature of the hot air in the hot-air dryer satisfies the following relationship:

$$80 \leq t_1 \geq 1.5 \times Mw/10^4 + 155,$$

wherein $t_1$ represents the temperature (° C.) of the hot air in the hot-air dryer and Mw represents the molecular weight of the hydrogenated block copolymer, and wherein when the hot-air dryer has a thermal conduction type heating means, the temperature of the thermal conduction type heating means satisfies the following relationship:

$$t_2 \leq 1.5 \times Mw/10^4 + 135,$$

wherein $t_2$ represents the temperature (° C.) of the thermal conduction type heating means and Mw is as defined above.

As the hydrogenated block copolymer used in step (1) above, the above-mentioned hydrogenated block copolymer can be used.

As the organic solvent solution of the hydrogenated block copolymer, the reaction mixture obtained by the above-mentioned hydrogenation as such can be used, or alternatively a solution obtained by dissolving the hydrogenated block copolymer in an organic solvent can be used. When the latter is used as the organic solvent solution of the hydrogenated block copolymer, the same solvent as used in the production of the above-mentioned block copolymer can be used as the organic solvent. The amount of the solvent in the solution is generally 50 to 2,000 parts by weight, preferably 100 to 1,500 parts by weight, relative to 100 parts by weight of the hydrogenated block copolymer. Depending on the properties of the hydrogenated block copolymer and the type of the solvent used, it is possible that the hydrogenated block copolymer has poor solubility in the solvent, so that a suspension of the hydrogenated copolymer is obtained instead of the solution of the hydrogenated block copolymer. In the present invention, such a suspension is also defined as a solution of the hydrogenated block copolymer.

With respect to the method for the steam stripping in step (2) above, there is no particular limitation, and any of the conventional methods can be used. For example, the steam striping can be conducted by the method described in Examined Japanese Patent Application Publication No. 4-65082.

With respect to the temperature of a solution of the hydrogenated block copolymer fed to the vessel used for the steam stripping, there is no particular limitation. For example, the same temperature as employed in the polymerization reaction for producing the block copolymer can be employed. In the steam stripping, a surfactant may be used as a crumb-forming agent. As a crumb-forming agent, an anionic surfactant, a cationic surfactant or a nonionic surfactant is generally used. The amount of the surfactant is generally in the range of from 0.1 to 3,000 ppm, in terms of the weight ratio of the surfactant to the water in the vessel used for the steam stripping. In addition to the above-mentioned surfactant, a salt of a metal, such as Li, Na, K, Mg, Ca, Al or Zn, can be used as a crumb-dispersing auxiliary. The concentration of the wet porous crumbs in the aqueous slurry after the steam stripping is generally adjusted so as to be within the range of from 0.5 to 25% by weight, preferably from 1 to 20% by weight, more preferably from 3 to 15% by weight, based on the weight of the water in the vessel used for the steam stripping. When the concentration of the wet porous crumbs in the aqueous slurry after the steam stripping is within the above-mentioned range, the crumbs having a suitable particle size as described below can be obtained and the subsequent dehydration step can be conducted efficiently.

In step (3) above, the aqueous slurry (obtained by the steam stripping in step (2) above) containing wet porous crumbs of the hydrogenated block copolymer, wherein the wet porous crumbs are dispersed in water (hot water), is subjected to dehydration treatment.

In the method of the present invention, it is preferred that the wet porous crumbs (obtained in step (2) above) to be subjected to dehydration treatment have a particle size distribution wherein the amount of those crumbs which do not pass through a 2-mesh screen (hereinafter, referred to as "large particle size wet crumbs") is 40% by weight or less, more advantageously 30% by weight or less, still more advantageously 15% by weight or less, based on the weight of the total mass of the wet porous crumbs; the amount of those crumbs which pass through a 30-mesh screen and do not pass through a 42-mesh screen (hereinafter, referred to as "small particle size wet crumbs") is 50% by weight or less, more advantageously 40% by weight or less, still more advantageously 30% by weight or less, based on the weight of the total mass of the wet porous crumbs; and the amount of those crumbs which pass through a 42-mesh screen (hereinafter, referred to as "extremely small particle size wet crumbs") is 0.1% by weight or less, more advantageously 0.05% by weight or less, most advantageously 0% by weight or less (that is, the wet porous crumbs contain no such crumb), based on the weight of the total mass of the wet porous crumbs.

When the amount of the large particle size wet crumbs is more than 40% by weight, there is a danger such that the dehydration in the dehydration step becomes unsatisfactory, and that, when the dried porous crumbs are used in a molding resin composition, the appearance of a shaped article produced from such a molding resin composition becomes poor. When the amount of the small particle size wet crumbs is more than 50% by weight, there is a danger such that, in the dehydration step, clogging occurs in water-separating means (such as a screen, a slit and a filter) of the dehydrator, and that the amount of crumbs, which are caused to be mixed into water separated by the dehydration treatment, is disadvantageously increased. With respect to the extremely small particle size wet crumbs, almost all of such crumbs surely pass through the screen or the slit of the dehydrator in the dehydration step, so that not only are extremely small particle size wet crumbs caused to be mixed into the separated water, but also a recovery loss of crumbs is likely to occur. Therefore, it is preferred that the amount of the extremely small particle size wet crumbs in the wet porous crumbs is as small as possible, and it is most preferred that no extremely small particle size wet crumb is contained in the wet porous crumbs.

The particle size distribution of the wet porous crumbs obtained by the steam stripping can be controlled by appropriately selecting steam stripping conditions, such as an agitation speed, a steam stripping temperature, the concentration of the crumbs in water used for the steam stripping, the amount of a crumb-forming agent used or a crumb-dispersing auxiliary used, and the method for feeding a solution of the hydrogenated block copolymer to the vessel used for the steam stripping. Further, in the case where the aqueous slurry obtained by the steam stripping contains large particle size wet crumbs in a very large amount, it is preferred that the large particle size wet crumbs are crushed using a slurry pump or the like having the capability of crushing particles prior to the dehydration so that the amount of the large particle size wet crumbs is decreased to a level falling within the above-mentioned range.

In the method of the present invention for producing the dried porous crumbs, the above-mentioned aqueous slurry containing wet porous crumbs is subjected to gravity dehydration, centrifugation dehydration or filtration dehydration to remove water from the slurry. Specifically, it is necessary that the wet porous crumbs should be dehydrated to an extent that the water content of the wet porous crumbs is in the range of from greater than 20% to 90% by weight, preferably from 30 to 85% by weight, more preferably from 35 to 80% by weight. When the water content of the wet porous crumbs after the dehydration step is more than 90% by weight, disadvantages are caused wherein, in the subsequent drying step, it is difficult to achieve satisfactory drying of the crumbs, and a disadvantageously large amount of energy or a disadvantageously prolonged period of time is required for drying the crumbs. On the other hand, for obtaining wet porous crumbs having a water content reduced to 20% by weight or less in the dehydration step, a very large apparatus is needed for the dehydration, and a disadvantageously large amount of energy or a disadvantageously prolonged period of time is required for dehydrating the crumbs. Therefore, it is not preferred to reduce to the water content of the wet porous crumbs to such a low level in the dehydration step.

In the present invention, the term "gravity dehydration" means a dehydration method using gravity. Specific examples of such methods include a method using a vibration or rotation screen having a passage size of from 0.5 to 10 mm, preferably from 1 to 5 mm.

As one of specific examples of the methods for centrifugation dehydration, there can be mentioned a method using a centrifugal filter (such as a Filba type centrifugal filter) or a centrifugal dehydrator (such as an automatic discharge type centrifugal dehydrator, a vibration discharge type centrifugal dehydrator, a knife discharge type centrifugal dehydrator, an Pusher type centrifugal dehydrator, or a disc-screw type centrifugal dehydrator), each having a liquid-separating means (such as a screen, a slit or a filter) which has a passage size of from 0.01 to 10 mm, preferably from 0.05 to 5 mm, more preferably from 0.1 to 3 mm. From the viewpoint of the efficiency in dehydration and the commercial-scale practice of dehydration, the centrifugation dehydration is generally conducted under 50 to 15,000 G, preferably 100 to 5,000 G, more preferably 300 to 3,000 G.

In the method of the present invention, the filtration dehydration can be conducted using, for example, a filter having a separating means, such as a screen, a slit or a filter, which has a passage size of from 0.01 to 10 mm, preferably from 0.05 to 5 mm, more preferably from 0.1 to 3 mm. Examples of such filters include a pressure filter, such as a cylinder type pressure filter, a disc type pressure filter, or a cylinder type precoat pressure filter; a vacuum filter, such as a continuous multi-compartment cylinder type vacuum filter, a continuous single-compartment cylinder type vacuum filter, a continuous disc type vacuum filter, or a continuous horizontal type vacuum filter (e.g., a continuous horizontal table type vacuum filter, a continuous horizontal belt type vacuum filter, or a continuous tilting-pan type vacuum filter).

The above-mentioned methods for dehydration can be used individually or in combination. For example, the gravity dehydration can be used in combination with the centrifugation dehydration or the filtration dehydration.

In the present invention, there is no particular limitation with respect to the operation conditions for the dehydration apparatuses, as long as the dehydrated wet porous crumbs having a water content within the above-mentioned range can be obtained. The operation conditions suitable for obtaining such dehydrated wet porous crumbs are chosen in view of the mode of the dehydration used in the dehydration step. Specifically, in the case of the gravity dehydration, the passage size of the screen of the dehydrator and the residence time of the wet porous crumbs are controlled; in the case of the centrifugation dehydration, the size of the screen of the dehydrator, the residence time of the wet porous crumbs and the centrifugal force of the dehydrator are controlled; and in the case of the filtration dehydration, the passage size of the filter used in the dehydrator, the residence time of the wet porous crumbs, and the pressure or the degree of vacuum of the dehydrator are controlled.

When the dehydration of the wet porous crumbs is conducted by a method other than the above-mentioned methods used in the present invention in the production of the dried porous crumbs, disadvantages are caused such that a shaped article produced from a molding resin composition containing the dried porous crumbs has a poor appearance. As an example of the above-mentioned dehydration method other than the methods used in the present invention, there can be mentioned a method using a mechanical compression type dehydrator, such as a roll type or a Banbury type dehydrator or a screw extruder type compression dehydrator.

In step (4) above, the dehydrated wet porous crumbs obtained in step (3) above are subjected to drying, to thereby obtain dried porous crumbs having a water content of 1% by weight or less, preferably 0.8% by weight or less, more preferably 0.5% by weight or less. When the water content of the dried porous crumbs exceeds 1% by weight, a shaped article produced from a molding resin composition containing the dried porous crumbs suffers disadvantageous phenomena, such as occurrence of foaming and silver streaks, so that the appearance of the shaped article becomes poor.

Examples of hot-air dryers used in the drying step of the method of the present invention include a packed bed type hot-air dryer, a conveyance type hot-air dryers, an agitation type hot-air dryer, and a fluidized or moving bed type hot-air dryer. Specific examples of packed bed type hot-air dryers and conveyance type hot-air dryers include a through flow dryer having a conveyer band, a through flow tunnel dryer, a through flow vertical dryer, a dryer having a vibration conveyer, a nozzle jet dryer, and a through flow or parallel flow type dryer. Specific examples of agitation type hot-air dryers include a rotary and a through flow rotary dryers, a multi-stage disc dryer, and an agitation type dryer, such as a cylinder or horizontal type dryer having an agitation blade. Examples of fluidized or moving bed type hot-air dryers include a spray dryer (such as a horizontal type parallel flow spray dryer, a cylinder or cyclone type parallel flow spray dryer having a disc atomizer, a cylinder type parallel flow spray dryer having a nozzle atomizer, a cylinder type counter-current spray dryer, a cylinder type mixed-flow spray dryer, or a cyclone type mixed-flow spray dryer), a pneumatic conveying dryer (such as a direct charge pneumatic conveying dryer, a pneumatic conveying dryer having a disperser, or a pneumatic conveying dryer having a disintegrator), and a fluidized bed type dryer (such as a semi-continuous fluidized bed dryer, a continuous single-stage fluidized bed dryer, a continuous single-compartment fluidized bed dryer, a counter-current multi-stage fluidized bed dryer, or a horizontal continuous multi-compartment fluidized bed dryer). Of the above-mentioned hot-air dryers, especially preferred are a through flow dryer having a conveyer band, a through flow tunnel dryer, a vertical type through flow dryer, a dryer having a vibration conveyer, a rotary and a through flow rotary dryers, an agitation type dryer, a pneumatic conveying dryer, and a fluidized bed type dryer. These dryers can be used individually or in combination.

In the drying step, the mean residence time of the crumbs in the dryer may be appropriately chosen so that dried porous crumbs having a desired water content can be obtained. For example, a dryer other than the pneumatic conveying dryer is used, the mean residence time of the crumbs in the dryer is preferably in the range of from 1 to 180 minutes, more preferably in the range of from 3 to 120 minutes, still more preferably in the range of from 3 to 100 minutes. However, when a fluidized bed type dryer is used, the mean residence time of the crumbs in the dryer is preferably in the range of from 3 to 90 minutes, more preferably in the range of from 5 to 60 minutes. When a pneumatic conveying dryer is used, the mean residence time of the crumbs in the dryer is generally 60 seconds or less, preferably 30 seconds or less. When the mean residence time of the crumbs in the dryer is too short, the drying of the crumbs tends to be unsatisfactory, or an extremely large apparatus for drying tends to be needed in the drying step. When the mean residence time of the crumbs in the dryer is too long, the hydrogenated block copolymer is likely to suffer unfavorable change of properties and characteristics, such as discoloration.

With respect to the hot-air dryer used in the drying step of the method of the present invention, the dryer may or may not have a thermal conduction type heating means. When a dryer having a thermal conduction type heating means is used in the drying step, the dryer may be used without operating the thermal conduction type heating means.

The temperature $t_1$ (° C.) of the hot air used in the drying step of the method of the present invention is 80° C. or more, preferably 90° C. or more, more preferably 100° C. or more. Further, the temperature $t_1$ of the hot air needs to satisfy the following relationship:

$$t_1 \leq 1.5 \times Mw/10^4 + 155,$$

preferably $$t_1 \leq 1.5 \times Mw/10^4 + 145,$$

more preferably $$t_1 \leq 1.5 \times Mw/10^4 + 135,$$

wherein Mw represents the molecular weight of the hydrogenated block copolymer.

When the temperature of the hot air used in the drying step is less than 80° C., disadvantages are caused wherein the drying of the crumbs is unsatisfactory, a disadvantageously long period of time is needed for drying the crumbs, and an extremely large apparatus is needed for drying the crumbs. On the other hand, when the temperature of the hot air exceeds the above-mentioned upper limit, the crumbs are likely to suffer discoloration or lowering of properties. Further, when the temperature of the hot air exceeds the above-mentioned upper limit, a continuous operation of the dryer for a prolonged period of time becomes impossible due to the fusion-bonding of the crumbs to the inner wall and the like of the dryer, so that a commercial-scale production of the dried porous crumbs becomes difficult. In addition, the crumbs fusion-bonded to the inner wall and the like of the dryer naturally suffer discoloration, and the discolored crumbs are likely to be contained in the dried porous crumbs obtained as final products. When such dried porous crumbs containing discolored crumbs are used in a molding resin composition, a shaped article produced from such a molding resin composition tends to have a poor appearance.

In the method of the present invention, after the drying step using a hot-air dryer, the resultant dried porous crumbs may be exposed to cold air or the like in a cooling zone to thereby lower the temperature of the crumbs.

In the present invention, the term "thermal conduction type heating means" means a heating means capable of functioning as a heat exchanger, such as a jacket provided around the hot-air dryer, or an electric heat conduction tube provided inside the hot-air dryer. In the case of a heating means (such as the above-mentioned jacket) provided outside the dryer, the crumbs and the air in the dryer can be heated by thermal conduction through the heat of the inner wall of the dryer which has been heated by the heating means. In the case of a heating means (such as the above-mentioned electric heat conduction tube) provided inside the hot-air dryer, the crumbs and the hot air in the hot-air dryer can be heated by thermal conduction through the heat of the surface of the heating means. In the present invention, the temperature of a thermal conduction type heating means is defined as the temperature of a heating medium fed to the thermal conduction type heating means in order to heat the thermal conduction type heating means, or the surface temperature of the thermal conduction type heating means. (When a heating medium is used to heat the thermal conduction type heating means, the temperature of the heating medium is substantially equal to the surface temperature of the thermal conduction type heating means.) As a method for heating the thermal conduction type heating means other than the method using the heating medium, there can be mentioned an electric heating, such as an electric resistance heating. As representative examples of heating media, there can be mentioned hot water and steam. However, various other substances, which are generally used as a heating medium, can also be used. Examples of such substances include an alkylbenzene, diphenyl ether, an alkylnaphthalene, triphenyl hydride, dibenzyltoluene and a paraffin mineral oil.

In the present invention, when a hot-air dryer having a thermal conduction type heating means is used in the drying step, not only does the temperature $t_1$ (° C.) of the hot air need to be within the above-mentioned range, but also the upper limit of the temperature $t_2$ (° C.) of the thermal conduction type heating means needs to satisfy the following relationship:

$$t_2 \leq 1.5 \times Mw/10^4 + 135,$$

preferably $$t_2 \leq 1.5 \times Mw/10^4 + 120,$$

more preferably $$t_2 \leq 1.5 \times Mw/10^4 + 110,$$

wherein Mw represents the molecular weight of the hydrogenated block copolymer.

Further, for the purpose of effectively conducting the drying, it is preferred that the lower limit of the temperature $t_2$ (° C.) of the thermal conduction type heating means satisfies the following relationship:

$$1.5 \times Mw/10^4 + 45 \leq t_2,$$

more advantageously $$1.5 \times Mw/10^4 + 55 \leq t_2,$$

still more advantageously $$1.5 \times Mw/10^4 + 65 \leq t_2,$$

wherein Mw represents the molecular weight of the hydrogenated block copolymer.

When the drying is conducted using a hot-air dryer having a thermal conduction type heating means under conditions wherein the temperature of the thermal conduction type heating means exceeds the above-mentioned range, the crumbs are likely to be fusion-bonded to the thermal conduction type heating means during the operation of the hot-air dryer, so that continuous operation of the hot-air dryer becomes difficult. Further, the fusion-bonded crumbs suffer discoloration or an unfavorable change of the properties and characteristics, and the resultant deteriorated crumbs are caused to be contained in the dried porous crumbs as final products, so that the quality of the dried porous crumbs becomes low.

When the drying of the dehydrated wet porous crumbs is not conducted by the above-mentioned hot-air drying method employed in the present invention, but is conducted by a method using a mechanical compression type dryer, such as a screw extruder type dryer, a kneader type dryer or an expander dryer, or a method using such a mechanical compression type dryer in combination with the above-mentioned hot-air dryer, it is impossible to obtain dried porous crumbs having the capability of absorbing an oil in an amount of 1.0 or more. When the thus obtained dried porous crumbs having the capability of absorbing an oil in an amount of less than 1.0 are used in a molding resin composition, a shaped article produced from such a molding resin composition has a poor appearance.

In the present invention, for efficiently conducting the drying in the drying step, it is preferred that the dehydrated wet porous crumbs obtained in step (3) above, which are subjected to drying in the drying step, have a particle size distribution wherein the amount of those crumbs which pass through a 6-mesh screen and do not pass through a 42-mesh screen (hereinafter, referred to as "suitable particle size dehydrated crumbs") is 50% by weight or more, more advantageously 70% by weight or more, still more advantageously 80% by weight or more, based on the weight of the total mass of the dehydrated wet porous crumbs. Further, with respect to the crumbs which pass through a 42-mesh screen (hereinafter, referred to as "extremely small particle size dehydrated crumbs"), such crumbs arise as fine particles in the dryer and remain at an upper-portion of the dryer during the drying step. Therefore, it is preferred that the content of the extremely small particle size dehydrated crumbs in the dehydrated wet porous crumbs is as small as possible.

When the dehydrated wet porous crumbs obtained in step (3) above do not have the above-mentioned particle size distribution, if desired, the crumbs may be crushed by means of a crusher or the like to thereby adjust the particle size of the crumbs prior to the drying. As a crusher used for crushing the crumbs, there can be mentioned a crusher generally used for crushing a resin or a rubber, such as a direct compression type crusher, a disc crusher, a roll crusher, a cylinder crusher, an impact crusher or a jet mill. Of these, especially preferred are a disc crusher (such as a rotary crusher, a hand mill, an attrition mill or a colloid mill), an impact crusher (such as a repulsion type crusher, a hammer crusher, a pulverizer, a disintegrator or a micron mill), and a jet mill (such as a jet-o-mizer or a micronizer). Further, for stably conducting the commercial-scale practice of the drying in a continuous manner for a prolonged period of time, e.g., a period of from 3 days to 2 months, it is preferred that the dehydrated wet porous crumbs charged into a dryer are suitable particle size dehydrated crumbs and have a particle size distribution wherein the particle size of all of the dehydrated wet porous crumbs are within the range of from 50 to 150% of the average particle size of the dehydrated wet porous crumbs. The reason for this is as follows. By the use of such dehydrated wet porous crumbs, the adhesion of dehydrated wet porous crumbs to the inner wall of the dryer and the rise of the dehydrated wet porous crumbs in the dryer can be satisfactorily suppressed, thereby preventing the deterioration of the dried porous crumbs as final products due to the presence of the discolored or fusion-bonded crumbs in the dried porous crumbs. Thus, it becomes possible to stably conduct a commercial-scale practice of the drying in a continuous manner for a prolonged period of time.

In the method of the present invention, if desired, after the drying step, the dried porous crumbs may be crushed by a crusher to adjust the particle size of the crumbs.

The method of the present invention for producing the dried porous crumbs can be advantageously practiced using commercial-scale apparatuses for the dehydration and the drying, which can be used for producing dried porous crumbs in an amount of 500 kg or more per day, preferably of 1,000 kg or more per day, more preferably of 5,000 kg or more per day.

With respect to the dried porous crumbs of the present invention, which have an advantageously high oil-absorbing capability, various additives may be added thereto, depending on the intended use of the dried porous crumbs. Examples of such additives include softening agents (such as a paraffin oil and a naphthene oim, which are generally known as a mineral oil softening agent for rubbers), a silicone oil, a plasticizer, a lubricant, an anti-oxidizing agent, an ultraviolet light absorber, a light stabilizer, an anti-block agent, an antistatic agent, a flame retardant, a pigment, a dye, an inorganic filler, an inorganic fiber, an organic fiber and a carbon black. Further, the dried porous crumbs can be blended with various thermoplastic resins. Examples of such thermoplastic resins include an olefin resin, such as a polyethylene, a polypropylene, a polybutene, a block or random copolymer of propylene and an α-olefin (such as ethylene, 1-butene, 1-hexene or 1-octene), an ethylene/vinyl acetate copolymer, or an ethylene/vinyl alcohol copolymer; a styrene resin, such as a polystyrene or a high-impact polystyrene; an acrylonitrile/styrene copolymer resin; an acrylonitrile/butadiene/styrene copolymer resin; a polyphenylene ether resin; a polyester resin; a polyamide resin; a polycarbonate resin; a polymethacrylate resin; a vinyl chloride resin; and a vinylidene chloride resin.

BEST MODE FOR CARRYING OUT THE INVENTION

Hereinbelow, the present invention will be described in more detail with reference to the following Examples and Comparative Examples, which should not be construed as limiting the scope of the present invention.

The measurement and evaluation conducted in the following Examples and Comparative Examples are as follows.

(1) Styrene Content of a Block Copolymer:

The styrene content of a block copolymer is calculated from the absorbance at a wavelength of 262 nm using an ultraviolet spectrometer (UV 200, manufactured and sold by Hitachi Ltd., Japan).

(2) Molecular Weight of a Block Copolymer:

A block copolymer is dissolved in tetrahydrofuran to thereby obtain a solution. The obtained solution is analyzed at 35° C. by gel permeation chromatography (GPC) using an apparatus manufactured and sold by Waters Assoc. Co., U.S.A. The molecular weight at the peak of the obtained GPC chromatogram (i.e., a peak molecular weight) is determined by the use of a calibration curve obtained using the peak molecular weights of standard polystyrene samples.

(3) Vinyl Bond Content and Degree of Hydrogenation of a Block Copolymer:

The vinyl bond content and degree of hydrogenation of a block copolymer are measured by the use of a nuclear magnetic resonance (NMR) apparatus (DPX-400, manufactured and sold by Bruker Analytik GmbH, Germany).

(4) Water Content of Crumbs:

Crumbs of a hydrogenated block copolymer having been treated in the dehydration step or the drying step are allowed to stand at 140° C. for 45 minutes to thereby dry the crumbs. The water content of the crumbs is calculated using, as the amount of water contained in the crumbs before the drying, the difference in weight between the crumbs before the drying and the crumbs after the drying.

(5) Particle Size Distribution of Crumbs:

Using a JIS screen, 100 g of crumbs are shaken for 20 minutes, to thereby classify the crumbs. Then, the amounts of the large particle size wet crumbs, the small particle size wet crumbs, the extremely small particle size wet crumbs, and the suitable particle size dehydrated crumbs are determined.

(6) Pore Diameter and Pore Volume of Dried Porous Crumbs:

Using a mercury porosimeter (Pascal, Type 140, manufactured and sold by Thermo Quest, Italy), the pore diameter and pore volume of dried porous crumbs are measured by the mercury injection method.

(7) Oil-Absorbing Capability of Dried Porous Crumbs:

10 g of dried porous crumbs are charged into a 200-mesh wire mesh pouch, and the pouch containing crumbs is immersed at 25° C. under atmospheric pressure in 1 liter of a paraffin process oil (Diana Process Oil Type PW-90, manufactured and sold by Idemitsu Petrochemical Co., Ltd., Japan) (kinetic viscosity at 40° C. 95.54 mm$^2$/s) so that the all of the dried porous crumbs are immersed in the oil. After the dried porous crumbs are immersed in the oil for 1 minute, the dried porous crumbs are immediately taken out from the oil and introduced into a centrifugal separator, and the centrifugal separator is operated under 1,000 G for 3 minutes to thereby remove oil adhering to the crumbs from the crumbs. Then, the dried porous crumbs are taken out from the centrifugal separator, and the weight of the porous crumbs is measured. The oil-absorbing capability of the dried porous crumbs is calculated by the following formula.

Oil-absorbing capability={(the weight of the oil-containing porous crumbs after the centrifugation)−(the weight of the dried porous crumbs before the immersion in the oil)}/(the weight of the dried porous crumbs before the immersion in the oil)

(8) Appearance of a Shaped Article:

100 Parts by weight of dried porous crumbs, 30 parts by weight of a commercially available polypropylene (J-Allomer MK755H, manufactured and sold by Japan Polyolefins Co., Ltd., Japan), and 105 parts by weight of a paraffin process oil (the above-mentioned Diana Process Oil PW-90) are mixed with each other to thereby prepare a molding composition. The prepared composition is melt kneaded at 190° C. and at 100 rpm using an extruder (200 mmΦ) having two screws which rotate in opposite directions to thereby obtain a shaped article in the form of strands. The surface of the obtained shaped article is visually observed and the appearance of the shaped article is evaluated by the following criteria.

<Criteria for the Evaluation of the Appearance of a Shaped Article>
A: The surface of the shaped article is smooth as a whole and the shaped article has a good appearance.
B: The surface of the shaped article is slightly rough.
C: The surface of the shaped article is very rough or foaming is observed in the surface of the shaped article and, hence, the appearance of the shaped article is poor.

EXAMPLE 1

Preparation of a Block Copolymer 36.7 kg of cyclohexane and 1.8 g of n-butyllithium as a polymerization catalyst were charged into a 100-liter autoclave in nitrogen atmosphere. Then, the polymerization reactions for producing a block copolymer were performed as follows. First, 0.8 kg of a styrene monomer was charged into the autoclave to thereby perform a polymerization reaction. Next, 3.4 kg of a 1,3-butadiene monomer was charged into the autoclave to thereby perform a further polymerization reaction. Finally, 0.8 kg of a styrene monomer was charged into the autoclave to thereby perform still a further polymerization reaction, thereby obtaining a solution of a block copolymer having an S-B-S configuration ("S" represents a polystyrene block, and "B" represents a polybutadiene block). During the above-mentioned polymerization reactions, the reaction temperature was controlled within the range of from 40 to 80° C., and tetramethylethylenediamine was used as an agent for adjusting the vinyl bond content of the polybutadiene blocks of the block copolymer. The obtained block copolymer had a styrene content of 32% by weight, and the polybutadiene blocks of the block copolymer had a vinyl bond content of 37 mol %.

(Preparation of a Hydrogenated Block Copolymer)

The autoclave containing the obtained solution of the block copolymer was deaerated under reduced pressure and purged with hydrogen gas. Then, the autoclave was maintained at 90° C. while stirring. A hydrogenation catalyst solution {which had been prepared by mixing a cyclohexane solution of di-p-tolylbis(η-cyclopentadienyl)titanium and a cyclohexane solution of n-butyllithium at 0° C. under a hydrogen pressure of 2.0 kg/cm$^2$} (Li/Ti molar ratio in the catalyst solution=4) was added to the solution of the block copolymer in the autoclave to thereby perform a hydrogenation for 2 hours while stirring and introducing dried hydrogen (hydrogen pressure: 5.0 kg/cm$^2$) into the autoclave, thereby obtaining a solution of a hydrogenated block copolymer. The degree of hydrogenation in the polybutadiene blocks of the obtained hydrogenated block copolymer was 99 mol % (almost all of the benzene rings in the polystyrene blocks were not hydrogenated). The molecular weight of the hydrogenated block copolymer was 300,000 and the concentration of the hydrogenated block copolymer in the solution was about 12% by weight.

Further, a sequence of the first, second and final polymerization reactions and hydrogenation reaction was repeated 5 times, to thereby obtain 208 kg of a solution of the hydrogenated block copolymer.

(Steam Stripping)

To the obtained solution of the hydrogenated block copolymer was added water for steam stripping in a molar amount 20 times the molar amount of the n-butyllithium used (the sum of the n-butyllithium used as the polymerization catalyst and the n-butyllithium used in the hydrogenation catalyst). Into the resultant mixture containing the hydrogenated block copolymer was introduced carbon dioxide gas to thereby adjust the pH of the mixture to about 7.5. Then, to the resultant mixture containing the hydrogenated block copolymer were added pentaerythrityl-tetrakis[3-(3,5-di-tertbutyl-4-hydroxyphenyl)propionate] as a stabilizer (0.1 part by weight, relative to 100 parts by weight of the hydrogenated block copolymer), and a mixture of phosphoric monoester of and diester of ω-hydroxy poly(oxyethylene)-α-dodecylether as a crumb-forming agent (100 ppm by weight, based on the weight of the water for the steam stripping system). Then, the steam stripping was conducted while controlling the temperature within the range of from 85 to 95° C. so as to remove the solvent, thereby obtaining an aqueous slurry containing wet porous crumbs of the hydrogenated block copolymer. The obtained aqueous slurry had a wet porous crumb content of about 10% by weight. With respect to the particle size distribution of the wet porous crumbs, the amounts of the large particle size wet crumbs and the small particle size wet crumbs were 13% by weight and 10% by weight, respectively, based on the weight of the total mass of the wet porous crumbs. The wet porous crumbs contained no extremely small particle size wet crumb.

(Dehydration and Drying Steps)

The above-mentioned aqueous slurry was subjected to gravity dehydration using a vibration screen having a slit width of 2 mm to thereby obtain dehydrated wet porous crumbs having a water content of 75% by weight.

The obtained dehydrated wet porous crumbs were charged into an impact crusher (Jiyu Mill, Type M-4, manufactured and sold by Nara Machinery Co., Ltd., Japan) at a rate of 25 kg/hr so as to wet crush the dehydrated wet porous crumbs to thereby obtain crushed, dehydrated wet porous crumbs having a suitable particle size crumb content of 83% by weight. The crushed crumbs had a water content of about 73% by weight, which shows that the water content of dehydrated wet porous crumbs was slightly reduced during the crushing.

Using a dryer as shown in FIG. 1, which is a horizontal continuous fluidized bed dryer (Type FBA-2, manufactured and sold by Okawara MFG. Co., Ltd., Japan) having no thermal conduction type heating means, the crushed, dehydrated wet porous crumbs were dried in the following manner.

Dehydrated wet porous crumbs 1 were fed to the dryer through rotary valve 9. Crumbs 2, which were being fluidized by the action of hot air 4 (150° C.) blown through perforated plate 7 {hole diameter: 15 mm; perforation ratio (the total area of all of the holes in the surface of the perforated plate/the area of the surface of the perforated plate as measured on the assumption that the plate has no holes): 5%}, were passed through the dryer, wherein crumbs 2 were passed over partition plates 8 provided in the dryer. The mean residence time of crumbs 2 in the dryer was about 25 minutes. In the dryer, crumbs 2 were dried by the above-mentioned hot air 4. Dried porous crumbs 3 were recovered from the outlet of the dryer through rotary valve 9. Fine particles included in hot air 4 were transferred to cyclone 6 and, then, discharged together with discharged air 5. In Table 1 are shown the block configuration and molecular weight of the block copolymer used for producing the dried porous crumbs, the particle size distribution of the crumbs subjected to dehydration, the dehydration method employed, the particle size distribution of the crumbs subjected to drying, the drying method employed, and the drying temperature.

The obtained dried porous crumbs had a water content of 0.4% by weight. With respect to the shaped article produced from the obtained dried porous crumbs, the result of the evaluation of the appearance, which was conducted in accordance with the above-mentioned method, was "A". These results are also shown in Table 1.

COMPARATIVE EXAMPLE 1

An aqueous slurry containing wet porous crumbs of a hydrogenated block copolymer was produced in substantially the same manner as in Example 1 (the crumb concentration of the aqueous slurry was about 5% by weight). The wet porous crumbs in the produced aqueous slurry had a particle size distribution wherein the amount of the small particle size wet crumbs exceeded 50% by weight, based on the weight of the total mass of the wet porous crumbs. The aqueous slurry was subjected to gravity dehydration in substantially the same manner as in Example 1, except that a vibration screen having a slit width of 0.5 mm was used, to thereby obtain unsatisfactorily dehydrated wet porous crumbs having a water content of 92% by weight.

The obtained dehydrated wet porous crumbs as such were subjected to hot air drying in substantially the same manner as in Example 1 (i.e., the wet crushing of the dehydrated wet porous crumbs was omitted), to thereby obtain dried porous crumbs. In Table 1 are shown the block configuration and molecular weight of the block copolymer used for producing the dried porous crumbs, the particle size distribution of the crumbs subjected to dehydration, the dehydration method employed, the particle size distribution of the crumbs subjected to drying, the drying method employed, and the drying temperature.

Since the wet porous crumbs were unsatisfactorily dehydrated, the obtained dried porous crumbs were also unsatisfactorily dried and had a water content of 3% by weight. The evaluation of the shaped article produced from the obtained dried porous crumbs was conducted in accordance with the above-mentioned method. As a result, vigorous foaming was observed in the surface of the shaped article and, hence, the appearance of the shaped article was "C".

COMPARATIVE EXAMPLE 2

Dried porous crumbs were produced in substantially the same manner as in Example 1, except that the drying temperature was changed to 70° C.

In Table 1 are shown the block configuration and molecular weight of the block copolymer used for producing the dried porous crumbs, the particle size distribution of the crumbs subjected to dehydration, the dehydration method employed, the particle size distribution of the crumbs subjected to drying, the drying method employed, and the drying temperature.

The produced dried porous crumbs were unsatisfactorily dried and had a water content of 1% by weight or more. With respect to the shaped article produced from the obtained dried porous crumbs, the result of the evaluation of the appearance, which was conducted in accordance with the above-mentioned method, was "C". These results are also shown in Table 1.

EXAMPLE 2

Figure 2:
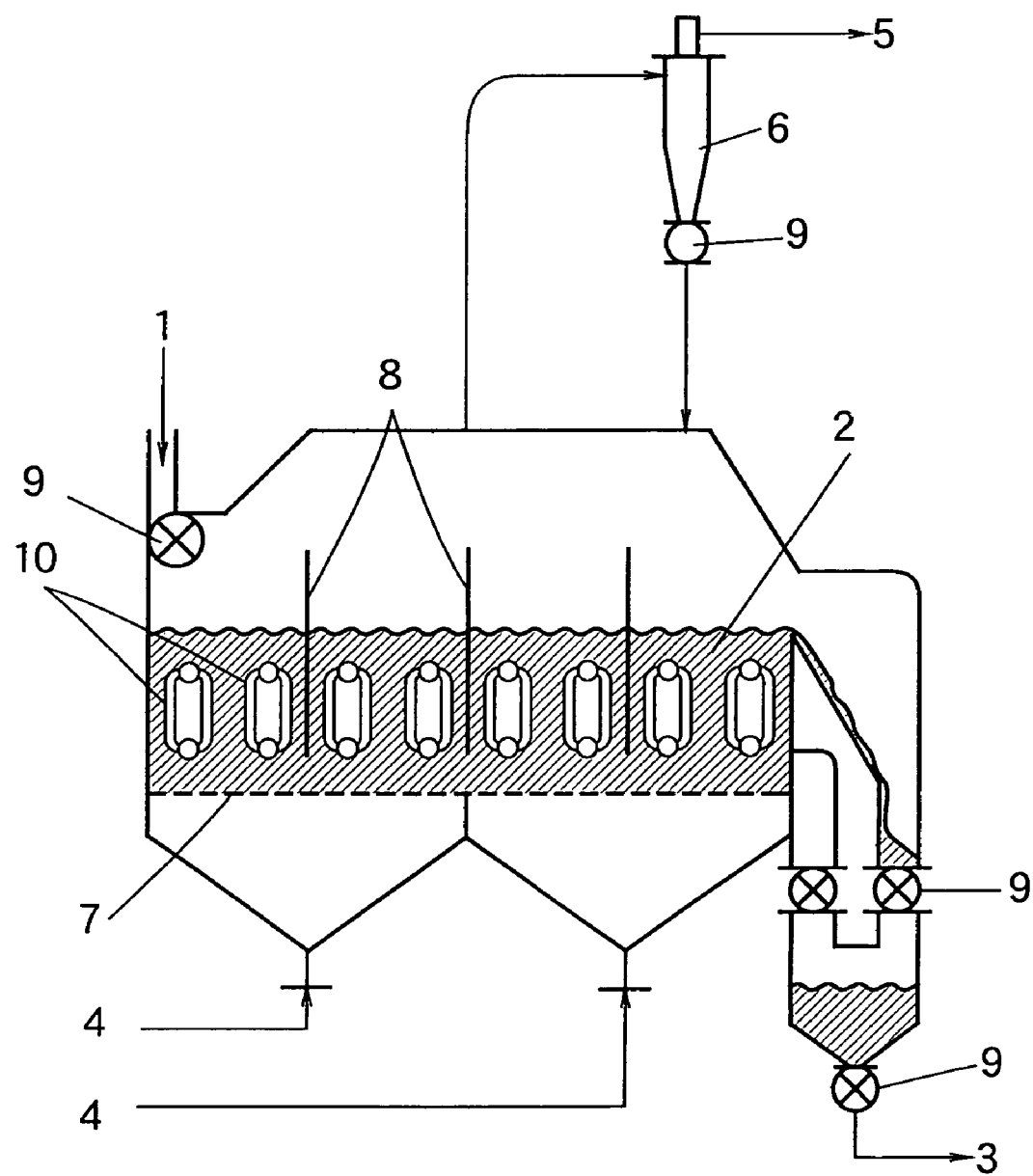
FIG. 2 is a diagram showing another mode of the method for drying the dehydrated wet porous crumbs, which is conducted in Example 2 using a horizontal continuous fluidized bed dryer having a thermal conduction type heating means.

Dried porous crumbs were produced in substantially the same manner as in Example 1, except that the drying of dehydrated wet porous crumbs was conducted using a hot-air dryer as shown in FIG. 2, which is a horizontal continuous fluidized bed dryer (Type FBA-2, manufactured and sold by Okawara MFG. Co., Ltd., Japan) having provided therein a heat conduction tube as a thermal conduction type heating means. In the drying step, dehydrated wet porous crumbs 1 were fed to the dryer through rotary valve 9. Crumbs 2, which were being fluidized by the action of hot air 4 (150° C.) blown through perforated plate 7, were passed through the dryer, wherein crumbs 2 were passed over partition plates 8 provided in the dryer. The mean residence time of crumbs 2 in the dryer was about 25 minutes. In the dryer, crumbs 2 were dried by the above-mentioned hot air 4 and thermal conduction type heating means 10, which was heated by steam (150° C.) as a heating medium. Dried porous crumbs 3 were recovered from the outlet of the dryer through rotary valve 9. Fine particles included in hot air were transferred to cyclone 6 and, then, discharged together with air 5.

In Table 1 are shown the block configuration and molecular weight of the block copolymer used for producing the dried porous crumbs, the particle size distribution of the crumbs subjected to dehydration, the dehydration method employed, the particle size distribution of the crumbs subjected to drying, the drying method employed, and the drying temperature.

The obtained dried porous crumbs had a water content of 0.2% by weight. With respect to the shaped article produced from the obtained dried porous crumbs, the result of the evaluation of the appearance, which was conducted in accordance with the above-mentioned method, was "A". These results are also shown in Table 1.

COMPARATIVE EXAMPLE 3

Dried porous crumbs were produced in substantially the same manner as in Example 2, except that the temperature of steam used for heating a heat conduction tube was changed to 190° C.

In Table 1 are shown the block configuration and molecular weight of the block copolymer used for producing the dried porous crumbs, the particle size distribution of the crumbs subjected to dehydration, the dehydration method employed, the particle size distribution of the crumbs subjected to drying, the drying method employed, and the drying temperature.

In the drying step, some crumbs were fusion-bonded to the heat conduction tube provided in the dryer, so that the drying could not be continuously performed. In addition, some fusion-bonded crumbs, which were discolored, were detached from the heat conduction tube and caused to be mixed into non-fusion-bonded crumbs. Therefore, the quality of the resultant dried porous crumbs containing the fusion-bonded, discolored crumbs was poor. The produced dried porous crumbs had an oil-absorbing capability of 0.7. The results are shown in Table 1.

COMPARATIVE EXAMPLE 4

Dehydrated wet porous crumbs having a water content of 75% by weight were produced in substantially the same manner as in Example 1. The produced, dehydrated wet porous crumbs as such were further dehydrated using a single-screw extruder type compression dehydrator (a mechanical compression type dehydrator), to thereby obtain further dehydrated crumbs having a water content of about 15% by weight. The obtained, further dehydrated crumbs were dried using a single-screw expander dryer (a mechanical compression type dryer) (the wet crushing of the dehydrated wet porous crumbs, which was conducted in Example 1 prior to the drying, was omitted), to thereby obtain preliminary dried porous crumbs having a water content of 5% by weight. The obtained preliminary dried porous crumbs having a water content of 5% by weight were further dried by hot air (about 90° C.) by means of a dryer having a vibration conveyer (manufactured and sold by Shinko Electric Co., Ltd., Japan), to thereby obtain dried porous crumbs.

In Table 1 are shown the block configuration and molecular weight of the block copolymer used for producing the dried porous crumbs, the particle size distribution of the crumbs subjected to dehydration, the dehydration method employed, the particle size distribution of the crumbs subjected to drying, the drying method employed, and the drying temperature.

The obtained dried porous crumbs had a water content of 0.3% by weight and an oil-absorbing capability of 0.6. With respect to the shaped article produced from the obtained dried porous crumbs, the result of the evaluation of the appearance, which was conducted in accordance with the above-mentioned method, was "C". These results are also shown in Table 1.

COMPARATIVE EXAMPLE 5

Dehydrated wet porous crumbs (having a water content of 75% by weight) obtained in substantially the same manner as in Example 1 were further dehydrated using a twin roll type compression dehydrator (i.e., a mechanical compression type dehydrator), to thereby obtain further dehydrated crumbs having a water content of about 43% by weight. The obtained, further dehydrated crumbs were dried using a plate dryer (drying temperature: 140° C.), to thereby obtain dried porous crumbs.

In Table 1 are shown the block configuration and molecular weight of the block copolymer used for producing the dried porous crumbs, the particle size distribution of the crumbs subjected to dehydration, the dehydration method employed, the particle size distribution of the crumbs subjected to drying, the drying method employed, and the drying temperature.

The obtained dried porous crumbs had a water content of 0.6% by weight and an oil-absorbing capability of 0.7. With respect to the shaped article produced from the obtained dried porous crumbs, the result of the evaluation of the appearance, which was conducted in accordance with the above-mentioned method, was "C". These results are also shown in Table 1.

EXAMPLE 3

Preparation of a Block Copolymer 34 kg of cyclohexane and 6.8 g of n-butyllithium as a polymerization catalyst were charged into a 100-liter autoclave. Then, the polymerization reactions for producing a block copolymer were performed as follows. First, 0.9 kg of a styrene monomer was charged into the autoclave to thereby perform a polymerization reaction. Next, 4.2 kg of a 1,3-butadiene monomer was charged into the autoclave to thereby perform a further polymerization reaction. Finally, 0.9 kg of a styrene monomer was charged into the autoclave to thereby perform still a further polymerization reaction, thereby obtaining a solution of a block copolymer having an S-B-S configuration. During the above-mentioned polymerization reactions, the reaction temperature was controlled within the range of from 40 to 80° C., and tetramethylethylenediamine was used as an agent for adjusting the vinyl bond content of the polybutadiene blocks of the block copolymer. The obtained block copolymer had a styrene content of 30% by weight, and the polybutadiene blocks of the block copolymer had a vinyl bond content of 40 mol %.

(Preparation of a Hydrogenated Block Copolymer)

The autoclave containing the obtained solution of the block copolymer was deaerated under reduced pressure and purged with hydrogen gas. Then, a hydrogenation was performed in substantially the same manner as in Example 1 to thereby obtain a solution of a hydrogenated block copolymer. The degree of hydrogenation in the polybutadiene blocks of the obtained hydrogenated block copolymer was 99 mol % (almost all of the benzene rings in the polystyrene blocks were not hydrogenated). The molecular weight of the hydrogenated block copolymer was 100,000 and the concentration of the hydrogenated block copolymer in the solution was about 15% by weight.

Further, a sequence of the above-mentioned polymerization reactions and hydrogenation reaction was repeated 4 times, to thereby obtain 160 kg of a solution of the hydrogenated block copolymer.

(Steam Stripping)

The obtained solution of hydrogenated block copolymer was subjected to steam stripping in substantially the same manner as in Example 1, to thereby obtain an aqueous slurry containing wet porous crumbs. The obtained aqueous slurry had a wet porous crumb content of about 10% by weight. The obtained aqueous slurry was transferred to a dehydrator (filtration device) described below by means of a slurry pump having a function of crushing particles, while crushing the crumbs in the slurry pump. With respect to the particle size distribution of the wet porous crumbs in the slurry after the crushing, the amount of the large particle size wet crumbs and the amount of the small particle size wet crumbs were 2% by weight and 25% by weight, respectively, based on the weight of the total mass of the wet porous crumbs. The wet porous crumbs contained no extremely small particle size wet crumb.

(Dehydration and Drying Steps)

Using an Oliver filter (manufactured and sold by Ishigaki Company Ltd., Japan), which is a continuous multi-compartment cylinder type vacuum filter, the slurry (discharged from the above-mentioned slurry pump) containing the crushed wet porous crumbs was subjected to filtration dehydration under conditions wherein the passage size of the filter was 0.01 mm and the degree of vacuum was −500 mmHg, to thereby obtain dehydrated wet porous crumbs having a water content of 65% by weight.

Using an agitation type dryer (Paddle Dryer, manufactured and sold by Nara Machinery Co., Ltd., Japan) having a thermal conduction type heating means, the obtained dehydrated wet porous crumbs were dried by hot air (120° C.), and the agitation shaft (provided in the dryer) and the jacket (provided around the dryer), each having been heated to 120° C. by steam, to thereby obtain dried porous crumbs. The mean residence time of the dehydrated wet porous crumbs in the dryer was 41 minutes.

In Table 1 are shown the block configuration and molecular weight of the block copolymer used for producing the dried porous crumbs, the particle size distribution of the crumbs subjected to dehydration, the dehydration method employed, the particle size distribution of the crumbs subjected to drying, the drying method employed, and the drying temperature.

The obtained dried porous crumbs had a water content of 0.9% by weight and an oil-absorbing capability of 1.2. With respect to the shaped article produced from the obtained dried porous crumbs, the result of the evaluation of the appearance, which was conducted in accordance with the above-mentioned method, was "A". These results are also shown in Table 1.

COMPARATIVE EXAMPLE 6

Dried porous crumbs were produced in substantially the same manner as in Example 3, except that the temperatures of the thermal conduction type heating means of the agitation type dryer and the hot air were changed to 160° C.

In Table 1 are shown the block configuration and molecular weight of the block copolymer used for producing the dried porous crumbs, the particle size distribution of the crumbs subjected to dehydration, the dehydration method employed, the particle size distribution of the crumbs subjected to drying, the drying method employed, and the drying temperature.

In the drying step, some crumbs were fusion-bonded to the inner wall of the agitation type dryer and the surface of the agitation blades of the dryer, so that the drying could not be continuously performed. In addition, some fusion-bonded crumbs, which were discolored, were detached from the inner wall of the agitation type dryer and the surface of the agitation blades of the dryer, and caused to be mixed into non-fusion-bonded crumbs. Therefore, the quality of the resultant dried porous crumbs containing the fusion-bonded, discolored crumbs was poor. These results are also shown in Table 1.

EXAMPLE 4

Figure 3:
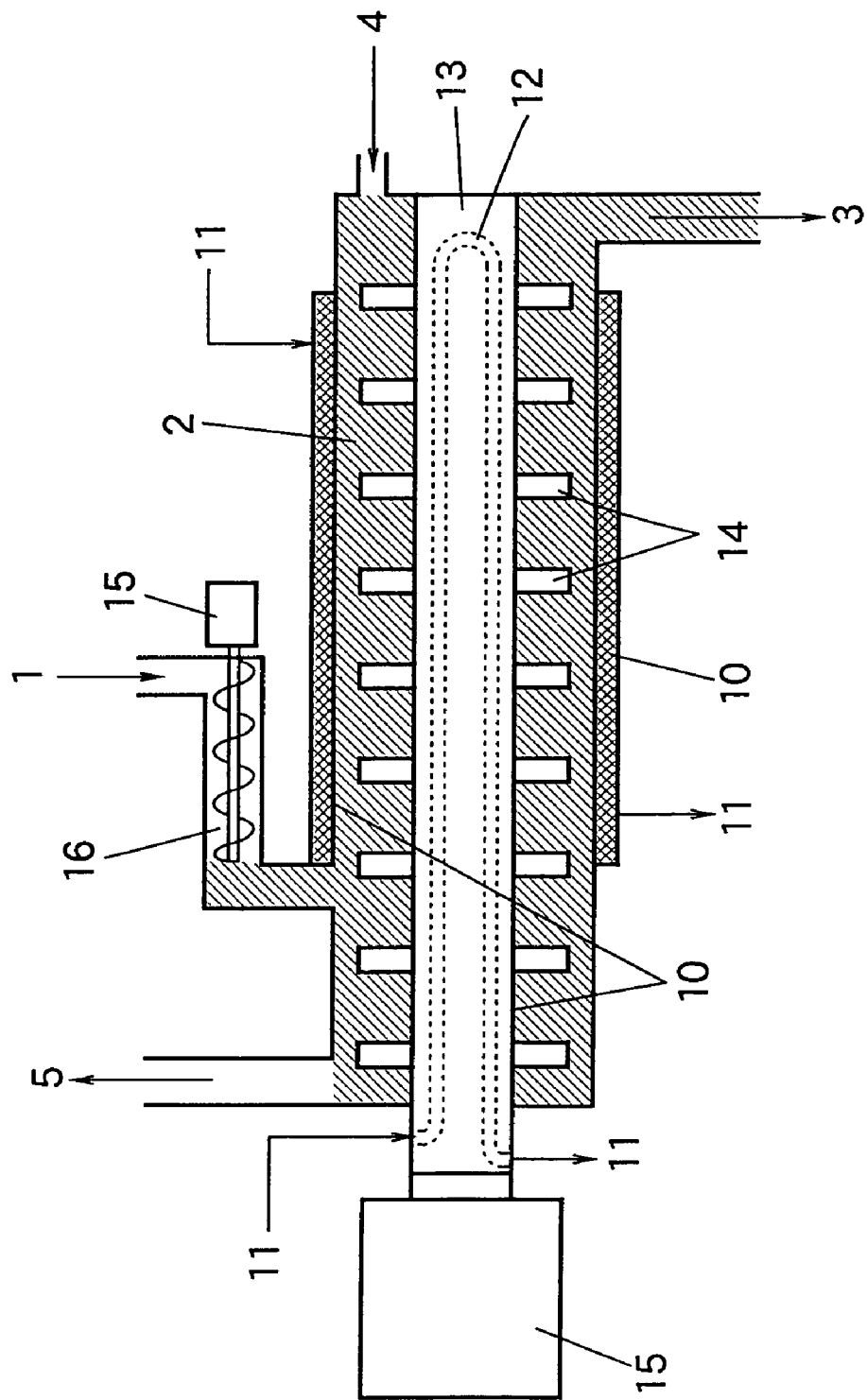
FIG. 3 is a diagram showing still another mode of the method for drying the dehydrated wet porous crumbs, which is conducted in Examples 4, 8 and 10 using an agitation type hot-air dryer having a thermal conduction type heating means.

Crushed, dehydrated wet porous crumbs (having a water content of 73% by weight) obtained in substantially the same manner as in Example 1 were dried using a dryer as shown in FIG. 3, which is a horizontal cylinder agitation type hot-air dryer having a thermal conduction type heating means (Solid Air, manufactured and sold by Hosokawa Micron Corporation, Japan). Specifically, the drying was conducted as follows.

The crushed, dehydrated wet porous crumbs were fed to the dryer by means of screw feeder 16. The dehydrated wet porous crumbs were dried by hot air 4 (150° C.), agitation shaft 13 having therein tube 12 to which steam 11 (150° C.) (heating medium) was fed, and a jacket heated by steam 11 (150° C.), wherein crumbs 2 were being fluidized by the action of the above-mentioned hot air 4 and agitation blades 14's attached to agitation shaft 13 (agitation shaft 13 was rotated by motor 15). Dried porous crumbs 3 were recovered from the outlet of the dryer. The mean residence time of crumbs 2 was 8 minutes. Hot air 4 used for drying was discharged from the dryer as air 5.

In Table 1 are shown the block configuration and molecular weight of the block copolymer used for producing the dried porous crumbs, the particle size distribution of the crumbs subjected to dehydration, the dehydration method employed, the particle size distribution of the crumbs subjected to drying, the drying method employed, and the drying temperature.

The obtained dried porous crumbs had a water content of 0.4% by weight and an oil-absorbing capability of 1.2. With respect to the shaped article produced from the obtained dried porous crumbs, the result of the evaluation of the appearance, which was conducted in accordance with the above-mentioned method, was "A". These results are also shown in Table 1.

EXAMPLE 5

Dehydrated porous crumbs having a water content of 65% by weight were produced in substantially the same manner as in Example 3, except that the filtration dehydration was conducted using a horizontal belt type continuous vacuum filter (Eaglefilter, manufactured and sold by Sumitomo Heavy Industries, Ltd., Japan) instead of the Oliver filter under conditions wherein the passage size of the filter was 0.01 mm and the degree of vacuum was −500 mmHg.

Using a pneumatic conveying hot-air dryer (Tornesh Dryer, manufactured and sold by Nara Machinery Co., Ltd., Japan), the produced dehydrated porous crumbs were dried under conditions wherein the temperature of hot air was 150° C. and the residence time of the dehydrated porous crumbs was in the range of from 1 to 3 seconds, to thereby obtain crumbs having a water content of 40% by weight. The obtained crumbs were further dried using the same dryer as used in Example 1 (which is a horizontal continuous fluidized bed dryer having no thermal conduction type heating means) under conditions wherein the temperature of hot air was 150° C. and the mean residence time of the crumbs was about 11 minutes, to thereby obtain dried porous crumbs.

In Table 1 are shown the block configuration and molecular weight of the block copolymer used for producing the dried porous crumbs, the particle size distribution of the crumbs subjected to dehydration, the dehydration method employed, the particle size distribution of the crumbs subjected to drying, the drying method employed, and the drying temperature.

The obtained dried porous crumbs had a water content of 0.3% by weight. With respect to the shaped article produced from the obtained dried porous crumbs, the result of the evaluation of the appearance, which was conducted in accordance with the above-mentioned method, was "A". These results are also shown in Table 1.

EXAMPLE 6

An aqueous slurry containing wet porous crumbs of a hydrogenated block copolymer was prepared in substantially the same manner as in Example 1, except that the amount of the crumb-forming agent used was changed to 600 ppm. Prior to the dehydration, the prepared aqueous slurry were fed to a slurry pump having a function of crushing particles, thereby crushing the wet porous crumbs contained in the aqueous slurry. With respect to the particle size distribution of the crushed wet porous crumbs in the resultant aqueous slurry, the amounts of the large particle size wet crumbs, the small particle size wet crumbs and the extremely small particle size wet crumbs were 0% by weight, 13% by weight and 0% by weight, respectively, based on the weight of the total mass of the wet porous crumbs.

The above-mentioned aqueous slurry containing the crushed wet porous crumbs was subjected to centrifugation dehydration by means of a continuous Pusher type centrifugation dehydrator (Escherwyss, manufactured and sold by Tukishima Kikai Co., Ltd., Japan) under conditions wherein the acceleration of gravity was 900G and the slit width of the screen for separating water was 0.3 mm, to thereby obtain dehydrated wet porous crumbs. The obtained dehydrated wet porous crumbs had a water content of 44 t by weight.

The obtained dehydrated wet porous crumbs were dried using the same dryer as used in Example 1 (which is a horizontal continuous fluidized bed dryer having no thermal conduction type heating means), to thereby obtain dried porous crumbs. In the drying step, the drying of the dehydrated wet porous crumbs were conducted under conditions wherein the temperature of hot air fed to the fluidized bed dryer was 150° C. and the mean residence time of the dehydrated wet porous crumbs was 14 minutes.

In Table 1 are shown the block configuration and molecular weight of the block copolymer used for producing the dried porous crumbs, the particle size distribution of the crumbs subjected to dehydration, the dehydration method employed, the particle size distribution of the crumbs subjected to drying, the drying method employed, and the drying temperature.

The obtained dried porous crumbs had a water content of 0.3% by weight and an oil-absorbing capability of 1.3. With respect to the shaped article produced from the obtained dried porous crumbs, the result of the evaluation of the appearance, which was conducted in accordance with the above-mentioned method, was "A". These results are also shown in Table 1.

EXAMPLE 7

Dried porous crumbs were produced in substantially the same manner as in Example 6, except that the drying of the wet porous crumbs was conducted using the same dryer as used in Example 2 (which is a continuous fluidized bed dryer having provided therein a heat conduction tube as a thermal conduction type heating means) under conditions wherein the temperature of hot air was 150° C., the temperature of steam used for heating the heat conduction tube was 150*C, and the mean residence time of the dehydrated wet porous crumbs was about 13 minutes.

In Table 1 are shown the block configuration and molecular weight of the block copolymer used for producing the dried porous crumbs, the particle size distribution of the crumbs subjected to dehydration, the dehydration method employed, the particle size distribution of the crumbs subjected to drying, the drying method employed, and the drying temperature.

The obtained dried porous crumbs had a water content of 0.2% by weight and an oil-absorbing capability of 1.2. With respect to the shaped article produced from the obtained dried porous crumbs, the result of the evaluation of the appearance, which was conducted in accordance with the above-mentioned method, was "A". These results are also shown in Table 1.

EXAMPLE 8

Dehydrated wet porous crumbs obtained in substantially the same manner as in Example 6 were dried in substantially the same manner as in Example 4, except that the mean residence time of the dehydrated wet porous crumbs was changed to 5 minutes, to thereby obtain dried porous crumbs.

In Table 1 are shown the block configuration and molecular weight of the block copolymer used for producing the dried porous crumbs, the particle size distribution of the crumbs subjected to dehydration, the dehydration method employed, the particle size distribution of the crumbs subjected to drying, the drying method employed, and the drying temperature.

The obtained dried porous crumbs had a water content of 0.2% by weight and an oil-absorbing capability of 1.3. With respect to the shaped article produced from the obtained dried porous crumbs, the result of the evaluation of the appearance, which was conducted in accordance with the above-mentioned method, was "A". These results are also shown in Table 1.

EXAMPLE 9

Dried porous crumbs were produced in substantially the same manner as in Example 3, except that the dehydration of the wet porous crumbs was conducted using a horizontal belt type continuous vacuum filter, and that the drying of the dehydrated wet porous crumbs was conducted using the same dryer as used in Example 1 (which is a horizontal continuous fluidized bed dryer having no thermal conduction type heating means) under conditions wherein the temperature of hot air fed to the fluidized bed dryer was 150° C. and the mean residence time of the dehydrated wet porous crumbs was 15 minutes. The dehydrated wet porous crumbs had a water content of 65% by weight.

In Table 1 are shown the block configuration and molecular weight of the block copolymer used for producing the dried porous crumbs, the particle size distribution of the crumbs subjected to dehydration, the dehydration method employed, the particle size distribution of the crumbs subjected to drying, the drying method employed, and the drying temperature.

The obtained dried porous crumbs had a water content of 0.3% by weight and an oil-absorbing capability of 1.3. With respect to the shaped article produced from the obtained dried porous crumbs, the result of the evaluation of the appearance, which was conducted in accordance with the above-mentioned method, was "A". These results are also shown in Table 1.

EXAMPLE 10

Dried porous crumbs were produced in substantially the same manner as in Example 9, except that the drying of the dehydrated wet porous crumbs was conducted using the same dryer as used in Example 4 (which is an agitation type hot-air dryer) and the mean residence time of the dehydrated wet porous crumbs was changed to 7 minutes.

In Table 1 are shown the block configuration and molecular weight of the block copolymer used for producing the dried porous crumbs, the particle size distribution of the crumbs subjected to dehydration, the dehydration method employed, the particle size distribution of the crumbs subjected to drying, the drying method employed, and the drying temperature.

The obtained dried porous crumbs had a water content of 0.6% by weight and an oil-absorbing capability of 1.2. With respect to the shaped article produced from the obtained dried porous crumbs, the result of the evaluation of the appearance, which was conducted in accordance with the above-mentioned method, was "A". These results are also shown in Table 1.

EXAMPLE 11

Preparation of a Block Copolymer 45.0 kg of cyclohexane and 1.2 g of n-butyllithium as a polymerization catalyst were charged into a 100-liter autoclave. Then, the polymerization reactions for producing a block copolymer were performed as follows. First, 0.625 kg of a styrene monomer was charged into the autoclave to thereby perform a polymerization reaction. Next, 3.75 kg of a mixture of 1,3-butadiene and isoprene (1,3-butadiene/isoprene weight ratio=40/60) was charged into the autoclave to thereby perform a further polymerization reaction. Finally, 0.625 kg of a styrene monomer was charged into the autoclave to thereby perform still a further polymerization reaction, thereby obtaining a solution of a block copolymer having an S-(B/I)-S configuration, wherein "S" represents a polystyrene block and "B/I" represents a poly(butadiene/isoprene) block. During the above-mentioned polymerization reactions, the reaction temperature was controlled within the range of from 40 to 80° C., and tetrahydrofuran was used as an agent for adjusting the vinyl bond content of the poly(butadiene/isoprene) blocks of the block copolymer. The obtained block copolymer had a styrene content of 25% by weight, and the poly(butadiene/isoprene) blocks of the block copolymer had a vinyl bond content (the sum of the 1,2-vinyl bond content and the 3,4-vinyl bond content) of 15 mol %.

(Preparation of a Hydrogenated Block Copolymer)

The autoclave containing the obtained solution of the block copolymer was deaerated under reduced pressure and purged with hydrogen gas. Then, in accordance with a method described in Examined Japanese Patent Application Publication No. 43-6636, a hydrogenation was performed using a nickel octanoate/triethylaluminum catalyst under conditions wherein the reaction temperature was in the range of from 145 to 155° C., the reaction time was 13 hr, and the hydrogen pressure was 35 kg/cm$^2$, to thereby obtain a solution of a hydrogenated block copolymer. The degree of hydrogenation in the poly(butadiene/isoprene) blocks of the obtained hydrogenated block copolymer was 98 mol % (almost all of the benzene rings in the polystyrene blocks were not hydrogenated). The molecular weight of the hydrogenated block copolymer was 400,000 and the concentration of the hydrogenated block copolymer in the solution was 10% by weight.

Further, a sequence of the above-mentioned polymerization reactions and hydrogenation reaction was repeated 5 times, to thereby obtain 250 kg of a solution of the hydrogenated block copolymer.

(Steam Stripping, Dehydration and Drying Steps)

The obtained solution of the hydrogenated block copolymer was subjected to steam stripping, and subsequent dehydration and drying in substantially the same manner as in Example 1, to thereby produce dried porous crumbs.

In Table 1 are shown the block configuration and molecular weight of the block copolymer used for producing the dried porous crumbs, the particle size distribution of the crumbs subjected to dehydration, the dehydration method employed, the particle size distribution of the crumbs subjected to drying, the drying method employed, and the drying temperature.

The produced dried porous crumbs had a water content of 0.5% by weight and an oil-absorbing capability of 1.1. With respect to the shaped article produced from the obtained dried porous crumbs, the result of the evaluation of the appearance, which was conducted in accordance with the above-mentioned method, was "A". These results are also shown in Table 1.

EXAMPLE 12

Preparation of a Block Copolymer 36.7 kg of cyclohexane and 2.3 g of n-butyllithium as a polymerization catalyst were charged into a 100-liter autoclave. Then, the polymerization reactions for producing a block copolymer were performed as follows. First, 0.5 kg of a 1,3-butadiene monomer was charged into the autoclave to thereby perform a polymerization reaction. Next, 1.0 kg of a styrene monomer was charged into the autoclave to thereby perform a further polymerization reaction. Next, 2.5 kg of a 1,3-butadiene monomer was charged into the autoclave to thereby perform still a further polymerization reaction. Finally, 1.0 kg of a styrene monomer was charged into the autoclave to thereby perform still a further polymerization reaction, thereby obtaining a solution of a block copolymer having an B-S-B-S configuration. During the above-mentioned polymerization reactions, the reaction temperature was controlled within the range of from 40 to 70° C., and tetramethylethylenediamine was used as an agent for adjusting the vinyl bond content of the polybutadiene blocks of the block copolymer. The obtained block copolymer had a styrene content of 40% by weight, and the polybutadiene blocks of the block copolymer had a vinyl bond content of 50 mol %.

(Preparation of a Hydrogenated Block Copolymer)

The autoclave containing the obtained solution of the block copolymer was deaerated under reduced pressure and purged with hydrogen gas. Then, a hydrogenation was performed in substantially the same manner as in Example 1, to thereby obtain a solution of a hydrogenated block copolymer. The degree of hydrogenation in the polybutadiene blocks of the obtained hydrogenated block copolymer was 99 mol % (almost all of the benzene rings in the polystyrene blocks were not hydrogenated). The molecular weight of the hydrogenated block copolymer was 220,000 and the concentration of the hydrogenated block copolymer in the solution was about 12% by weight.

Further, a sequence of the above-mentioned polymerization reactions and hydrogenation reaction was repeated 5 times, to thereby obtain 208 kg of a solution of the hydrogenated block copolymer.

(Steam Stripping, Dehydration and Drying Steps)

The obtained solution of the hydrogenated block copolymer was subjected to steam stripping in substantially the same manner as in Example 1, to thereby obtain an aqueous slurry containing wet porous crumbs of the hydrogenated block copolymer.

The obtained aqueous slurry was subjected to dehydration and drying in substantially the same manner as in Example 6, to thereby produce dried porous crumbs.

In Table 1 are shown the block configuration and molecular weight of the block copolymer used for producing the dried porous crumbs, the particle size distribution of the crumbs subjected to dehydration, the dehydration method employed, the particle size distribution of the crumbs subjected to drying, the drying method employed, and the drying temperature.

The produced dried porous crumbs had a water content of 0.4% by weight and an oil-absorbing capability of 1.2. With respect to the shaped article produced from the obtained dried porous crumbs, the result of the evaluation of the appearance, which was conducted in accordance with the above-mentioned method, was "A". These results are also shown in Table 1.

EXAMPLE 13

Preparation of a Block Copolymer 36.7 kg of cyclohexane and 2.0 g of n-butyllithium as a polymerization catalyst were charged into a 100-liter autoclave. Then, the polymerization reactions for producing a block copolymer were performed as follows. First, 0.375 kg of a styrene monomer was charged into the autoclave to thereby perform a polymerization reaction. Next, 4.25 kg of an isoprene monomer was charged into the autoclave to thereby perform a further polymerization reaction. Finally, 0.375 kg of a styrene monomer was charged into the autoclave to thereby perform still a further polymerization reaction, thereby obtaining a solution of a block copolymer having an S-I-S configuration, wherein "S" represents a polystyrene block and "I" represents a polyisoprene block. During the above-mentioned polymerization reactions, the reaction temperature was controlled within the range of from 40 to 80° C., and tetrahydrofuran was used as an agent for adjusting the vinyl bond content of the polyisoprene blocks of the block copolymer. The obtained block copolymer had a styrene content of 15% by weight, and the polyisoprene blocks of the block copolymer had a vinyl bond content of 7 mol %.

(Preparation of a Hydrogenated Block Copolymer)

The autoclave containing the obtained solution of the block copolymer was deaerated under reduced pressure and purged with hydrogen gas. Then, a hydrogenation was performed in substantially the same manner as in Example 11 (that is, the hydrogenation was performed using a nickel octanoate/triethylalminum catalyst under conditions wherein the reaction temperature was in the range of from 145 to 155° C., the reaction time was 13 hr, and the hydrogen pressure was 35 kg/cm$^2$), to thereby obtain a solution of a hydrogenated block copolymer. The degree of hydrogenation in the polyisoprene blocks of the obtained hydrogenated block copolymer was 98 mol % (almost all of the benzene rings in the polystyrene blocks were not hydrogenated). The molecular weight of the hydrogenated block copolymer was 250,000 and the concentration of the hydrogenated block copolymer in the solution was about 12% by weight.

Further, a sequence of the above-mentioned polymerization reactions and hydrogenation reaction was repeated 5 times, to thereby obtain 208 kg of a solution of the hydrogenated block copolymer.

(Steam Stripping, Dehydration and Drying Steps)

The obtained solution of the hydrogenated block copolymer was subjected to steam stripping in substantially the same manner as in Example 1, to thereby obtain an aqueous slurry containing wet porous crumbs of the hydrogenated block copolymer.

The obtained aqueous slurry was subjected to dehydration and drying in substantially the same manner as in Example 1, to thereby produce dried porous crumbs.

In Table 1 are shown the block configuration and molecular weight of the block copolymer used for producing the dried porous crumbs, the particle size distribution of the crumbs subjected to dehydration, the dehydration method employed, the particle size distribution of the crumbs subjected to drying, the drying method employed, and the drying temperature.

The produced dried porous crumbs had a water content of 0.6% by weight and an oil-absorbing capability of 1.2. With respect to the shaped article produced from the obtained dried porous crumbs, the result of the evaluation of the appearance, which was conducted in accordance with the above-mentioned method, was "A". These results are also shown in Table 1.

COMPARATIVE EXAMPLE 7

Dried porous crumbs of a hydrogenated block copolymer was produced in substantially the same manner as in Example 1, except that the conditions for the polymerization reactions for producing the block copolymer were changed so that the molecular weight of the hydrogenated block copolymer became 40,000.

In Table 1 are shown the block configuration and molecular weight of the block copolymer used for producing the dried porous crumbs, the particle size distribution of the crumbs subjected to dehydration, the dehydration method employed, the particle size distribution of the crumbs subjected to drying, the drying method employed, and the drying temperature.

In the drying step, the dehydrated porous crumbs adhering to the inner wall of the fluidized bed dryer and fusion-bonded to one another to form a mass of fusion-bonded crumbs, so that the drying operation could not be stably conducted. Therefore, it was impossible to measure the particle size distribution of the produced dried porous crumbs. It was also impossible to evaluate the appearance of the shaped article produced from the produced dried porous crumbs. The produced dried porous crumbs had an oil-absorbing capability of 0.8. These results are also shown in Table 1.

EXAMPLE 14

In accordance with the method of Example 1, the continuous production of the dried porous crumbs was conducted for 5 days using large apparatuses for the dehydration the drying so that the daily production of the dried porous crumbs became 600 kg.

In Table 1 are shown the block configuration and molecular weight of the block copolymer used for producing the dried porous crumbs, the particle size distribution of the crumbs subjected to dehydration, the dehydration method employed, the particle size distribution of the crumbs subjected to drying, the drying method employed, and the drying temperature.

The produced dried porous crumbs had a water content of about 0.5% and did not suffer discoloration. The dried porous crumbs had an oil-absorbing capability of 1.2. During the operation of the apparatuses, some dehydrated porous crumbs having a small particle size arose in the fluidized bed dryer; however, a fusion-bonding of crumbs to the inner wall of the dryer or the like did not occur, so that the continuous operation for the production of the dried porous crumbs could be relatively stably conducted. With respect to the shaped article produced from the obtained dried porous crumbs, the result of the evaluation of the appearance, which was conducted in accordance with the above-mentioned method, was "A". These results are also shown in Table 1.

EXAMPLE 15

The continuous production of dried porous crumbs (i.e., the continuous operation of the apparatuses for the dehydration and the drying) was conducted for 5 days in substantially the same manner as in Example 14, except that the particle size distribution of the crumbs subjected to drying was changed as described below, and the wet crushing of the dehydrated wet porous crumbs was omitted. In Example 15, an aqueous slurry (obtained by steam stripping) containing wet porous crumbs of a hydrogenated block copolymer was charged into a slurry crusher to thereby crush wet porous crumbs. The dehydration of the resultant aqueous slurry containing the crushed wet porous crumbs was conducted using a vibration screen having a slit width of 1 mm (in Example 14, the slit width of the dryer was 2 mm), to thereby obtain dehydrated wet porous crumbs having a particle size distribution wherein the amount of those crumbs which pass through a 10-mesh screen and do not pass through a 19-mesh screen was 100% by weight, based on the weight of the total mass of the dehydrated wet porous crumbs. The obtained dehydrated wet porous crumbs were subjected to drying to thereby obtain dried porous crumbs.

In Table 1 are shown the block configuration and molecular weight of the block copolymer used for producing the dried porous crumbs, the particle size distribution of the crumbs subjected to dehydration, the dehydration method employed, the particle size distribution of the crumbs subjected to drying, the drying method employed, and the drying temperature.

The obtained dried porous crumbs had a water content of about 0.5% by weight and did not suffer discoloration. Further, the fluidized state of the crumbs in the dryer is very stable, so that the continuous operation for the production of the dried porous crumbs could be stably conducted without suffering disadvantageous phenomena (caused by the rise of the crumbs having a small particle size), such as the staying of the crumbs at an upper portion of the fluidized bed type dryer or at the outlet of the dryer, and the fusion-bonding of the crumbs to the inner wall of the dryer. With respect to the shaped article produced from the obtained dried porous crumbs, the result of the evaluation of the appearance, which was conducted in accordance with the above-mentioned method, was "A". These results are also shown in Table 1.

EXAMPLE 16

The continuous production of the dried porous crumbs (i.e., the continuous operation of the apparatuses for the dehydration and the drying) was conducted for 5 days in substantially the same manner as in Example 14, except that the amount of the crumb-forming agent used was changed to 10 ppm, and that the wet crushing of the dehydrated wet porous crumbs was omitted and the dehydrated wet porous crumbs (discharged from the dehydrator) as such were subjected to drying. The dehydrated wet porous crumbs subjected to drying had a particle size distribution wherein the amount of those crumbs which pass through a 6-mesh screen and do not pass through a 42-mesh screen was 45% by weight, based on the weight of the total mass of the dehydrated wet porous crumbs.

In Table 1 are shown the block configuration and molecular weight of the block copolymer used for producing the dried porous crumbs, the particle size distribution of the crumbs subjected to dehydration, the dehydration method employed, the particle size distribution of the crumbs subjected to drying, the drying method employed, and the drying temperature.

During the continuous operation of the fluidized bed dryer, the fluidized state of the crumbs in the dryer was unstable, wherein extremely small particle size wet crumbs rose in the dryer and stayed at an upper portion of the dryer and at the outlet of the dryer. Therefore, from the commercial viewpoint, the continuous operation of the dryer in this Example was relatively inefficient and unstable. However, with respect to the shaped article produced from the obtained dried porous crumbs, the result of the evaluation of the appearance, which was conducted in accordance with the above-mentioned method, was "A". These results are also shown in Table 1.

TABLE 1

| | Block configuration of block co-polymer | Molecular weight (Mw) | Particle size distribution of crumbs prior to dehydration [wt. % of large particle and small particle size crumbs][5] | Dehydration apparatus | Particle size distribution of crumbs prior to drying [wt. % of suitable particle size crumbs] | Drying apparatus | Drying Temp. | Temp. range defined in the present invention[2] $t_1$: hot air (° C.) $t_2$: thermal conduction type heating means (° C.) | Water content (wt. %) | Particle size distribution [wt. % of suitable particle size crumbs] | Average pore diameter (μm) | Pore Volume (mm³/g) | Oil-absorbing capability | Evaluation of the appearance of shaped article[3] | Productivity of dried porous crumbs |
|---|---|---|---|---|---|---|---|---|---|---|---|---|---|---|---|
| Ex. 1 | S-B-S | 300,000 | Large particle size crumbs: 13 Small particle size crumbs: 10 | Vibration screen | Suitable particle size crumbs: 83 | Horizontal continuous fluidized bed dryer having no thermal conduction type heating means | $t_1$: 150 $t_2$: — | $t_1$: 80 to 200 $t_2$: — | 0.4 | Suitable particle size crumbs: 83 | 11.2 | 366 | 1.2 | A | High productivity |
| Ex. 2 | " | 300,000 | Large particle size crumbs: 13 Small particle size crumbs: 10 | Vibration screen | Suitable particle size crumbs: 83 | Horizontal continuous fluidized bed dryer having a heat conduction tube | $t_1$: 150 $t_2$: 150 | $t_1$: 80 to 200 $t_2$: (90) to 180 | 0.2 | Suitable particle size crumbs: 82 | 10.9 | 350 | 1.1 | A | High productivity |
| Ex. 3 | " | 100,000 | Large particle size crumbs: 2 Small particle size crumbs: 25 | Oliver filter | Suitable particle size crumbs: 95 | Agitation type dryer | $t_1$: 120 $t_2$: 120 | $t_1$: 80 to 170 $t_2$: (60) to 150 | 0.9 | Suitable particle size crumbs: 97 | 9.7 | 351 | 1.2 | A | High productivity |
| Ex. 4 | " | 300,000 | Large particle size crumbs: 13 Small particle size crumbs: 10 | Vibration screen | Suitable particle size crumbs: 83 | Agitation type hot-air dryer | $t_1$: 150 $t_2$: — | $t_1$: 80 to 200 $t_2$: (90) to 180 | 0.4 | Suitable particle size crumbs: 85 | 11.0 | 366 | 1.2 | A | High productivity |
| Ex. 5 | " | 100,000 | Large particle size crumbs: 2 Small particle size crumbs: 25 | Continuous horizontal belt type vacuum filter | Suitable particle size crumbs: 95 | Pneumatic conveying dryer → Horizontal continuous fluidized bed dryer having no thermal conduction type heating means | $t_1$: 150 (Pneumatic conveying dryer) $t_2$: 150 (Fluidized bed type dryer) $t_2$: — (Fluidized bed type dryer) | $t_1$: 80 to 170 $t_1$: 80 to 170 $t_2$: — | 0.3 | Suitable particle size crumbs: 95 | 9.9 | 355 | 1.2 | A | High productivity |
| Ex. 6 | " | 300,000 | Large particle size crumbs: 0 Small particle size crumbs: 13 | Continuous Pusher type centrifugal dehydrator | Suitable particle size crumbs: 100 | Horizontal continuous fluidized bed dryer having no thermal conduction type heating means | $t_1$: 150 $t_2$: — | $t_1$: 80 to 200 $t_2$: — | 0.3 | Suitable particle size crumbs: 100 | 11.4 | 394 | 1.3 | A | High productivity |
| Ex. 7 | " | 300,000 | Large particle size crumbs: 0 Small particle size crumbs: 10 | Continuous Pusher type centrifugal | Suitable particle size crumbs: 100 | Horizontal continuous fluidized bed dryer having a | $t_1$: 150 $t_2$: 150 | $t_1$: 80 to 200 $t_2$: (90) to 180 | 0.2 | Suitable particle size crumbs: 100 | 11.2 | 373 | 1.2 | A | High productivity |

TABLE 1-continued

| | Block configuration of block copolymer | Molecular weight (Mw) | Particle size distribution of crumbs prior to dehydration [wt. % of large particle size and small particle size crumbs][5] | Dehydration apparatus | Particle size distribution of crumbs prior to drying [wt. % of suitable particle size crumbs] | Drying apparatus | Drying Temp. | Temp. range defined in the present invention[2] t₁: hot air (° C.) t₂: thermal conduction type heating means (° C.) | Water content (wt. %) | Particle size distribution [wt. % of suitable particle size crumbs] | Average pore diameter (μm) | Pore Volume (mm³/g) | Oil-absorbing capability | Evaluation of the appearance of shaped article[3] | Productivity of dried porous crumbs |
|---|---|---|---|---|---|---|---|---|---|---|---|---|---|---|---|
| | | | | | | heat conduction tube | | | | 100 | | | | | |
| Ex. 8 | " | 300,000 | Large particle size crumbs: 0 Small particle size crumbs: 13 | Continuous Pusher type centrifugal dehydrator | Suitable particle size crumbs: 100 | Agitation type hot-air dryer | t₁: 150 t₂: 150 | t₁: 80 to 200 t₂: (90) to 180 | 0.2 | Suitable particle size crumbs: 100 | 11.2 | 389 | 1.3 | A | High productivity |
| Ex. 9 | " | 100,000 | Large particle size crumbs: 2 Small particle size crumbs: 25 | Continuous horizontal belt type vacuum filter | Suitable particle size crumbs: 95 | Horizontal continuous fluidized bed dryer having no thermal conduction type heating means | t₁: 150 t₂: — | t₁: 80 to 170 t₂: — | 0.3 | Suitable particle size crumbs: 95 | 10.0 | 359 | 1.3 | A | High productivity |
| Ex. 10 | " | 100,000 | Large particle size crumbs: 2 Small particle size crumbs: 25 | Continuous horizontal belt type vacuum filter | Suitable particle size crumbs: 95 | Agitation type hot-air dryer | t₁: 150 t₂: 150 | t₁: 80 to 170 t₂: (60) to 150 | 0.6 | Suitable particle size crumbs: 96 | 10.3 | 351 | 1.2 | A | High productivity |
| Ex. 11 | S-(B/I)-S | 400,000 | Large particle size crumbs: 13 Small particle size crumbs: 10 | Vibration screen | Suitable particle size crumbs: 83 | Horizontal continuous fluidized bed dryer having no thermal conduction type heating means | t₁: 150 t₂: — | t₁: 80 to 215 t₂: — | 0.5 | Suitable particle size crumbs: 83 | 9.9 | 370 | 1.1 | A | High productivity |
| Ex. 12 | B-S-B-S | 220,000 | Large particle size crumbs: 0 Small particle size crumbs: 13 | Continuous Pusher type centrifugal dehydrator | Suitable particle size crumbs: 100 | Horizontal continuous fluidized bed dryer having no thermal conduction type heating means | t₁: 150 t₂: — | t₁: 80 to 185 t₂: — | 0.4 | Suitable particle size crumbs: 100 | 11.4 | 367 | 1.2 | A | High productivity |
| Ex. 13 | S-I-S | 250,000 | Large particle size crumbs: 13 Small particle size crumbs: 10 | Vibration screen | Suitable particle size crumbs: 83 | Horizontal continuous fluidized bed dryer having no thermal conduction type heating means | t₁: 150 t₂: — | t₁: 80 to 192.5 t₂: — | 0.6 | Suitable particle size crumbs: 83 | 10.7 | 370 | 1.2 | A | High productivity |
| Ex. 14 | S-B-S | 300,000 | Large particle size crumbs: 13 Small particle size crumbs: 10 | Vibration screen | Suitable particle size crumbs: 83 | Horizontal continuous fluidized bed dryer having no thermal conduction type heating means | t₁: 150 t₂: — | t₁: 80 to 200 t₂: — | 0.5 | Suitable particle size crumbs: 83 | 11.4 | 362 | 1.2 | A | High productivity [Continuous operation (5 days)] |
| Ex. | S-B-S | 300,000 | Large particle | Vibration | Suitable parti- | Horizontal con- | T₁: 150 | t₁: 80 to 200 | 0.5 | Suitable | 11.4 | 373 | 1.3 | A | High |

TABLE 1-continued

| | Block configuration of block co-polymer | Molecular weight (Mw) | Particle size distribution of crumbs prior to dehydration [wt. % of large particle size and small particle size crumbs][5] | Dehydration apparatus | Particle size distribution of crumbs prior to drying [wt. % of suitable particle size crumbs] | Drying apparatus | Drying Temp. $t_1$: hot air $t_2$: thermal conduction type heating means (°C.) | Temp. range defined in the present invention[2] $t_1$: hot air $t_2$: thermal conduction type heating means (°C.) | Water content (wt. %) | Particle size distribution [wt. % of suitable particle size crumbs] | Average pore diameter (μm) | Pore Volume (mm³/g) | Oil-absorbing capability | Evaluation of the appearance of shaped article[3] | Productivity of dried porous crumbs |
|---|---|---|---|---|---|---|---|---|---|---|---|---|---|---|---|
| 15 | | | Large particle size crumbs: 13 Small particle size crumbs: 0 | screen | Suitable particle size crumbs[4]: 100 | tinuous fluidized bed dryer having no thermal conduction type heating means | $t_2$: — | $t_2$: — | | particle size crumbs: 100 | | | | | productivity [Continuous operation (5 days)] |
| Ex. 16 | " | 300,000 | Large particle size crumbs: 13 Small particle size crumbs: 10 | Vibration screen | Suitable particle size crumbs: 45 | Horizontal continuous fluidized bed dryer having no thermal conduction type heating means | $t_1$: 150 $t_2$: — | $t_1$: 80 to 200 $t_2$: — | 0.5 | Suitable particle size crumbs: 44 | 11.2 | 369 | 1.1 | A | Low productivity (Continuous operation) |
| Comp. Ex. 1 | " | 300,000 | Small particle size crumbs: 50 or more | Vibration screen | Suitable particle size crumbs: 100 | Horizontal continuous fluidized bed dryer having no thermal conduction type heating means | $t_1$: 150 $t_2$: — | $T_1$: 80 to 200 $T_2$: — | 3.0 | Suitable particle size crumbs: 100 | Not measured | Not measured | Not measurable | C | — |
| Comp. Ex. 2 | S-B-S | 300,000 | Small particle size crumbs: 50 or more | Vibration screen | Suitable particle size crumbs: 100 | Horizontal continuous fluidized bed dryer having no thermal conduction type heating means | $t_1$: 70 $t_2$: — | $T_1$: 80 to 200 $t_2$: — | 1.0 to 3.0 | Suitable particle size crumbs: 100 | Not measured | Not measured | Not measurable | C | — |
| Comp. Ex. 3 | " | 300,000 | Large particle size crumbs: 13 Small particle size crumbs: 10 | Vibration screen | Suitable particle size crumbs: 83 | Horizontal continuous fluidized bed dryer having a heat conduction tube | $t_1$: 150 $t_2$: 190 | $T_1$: 80 to 200 $t_2$: (90) to 180 | 0.2 | Suitable particle size crumbs: 45 | 14.4 | 122 to 330 | 0.7 | Not evaluated | Discoloration of crumbs, low productivity |
| Comp. Ex. 4 | " | 300,000 | Large particle size crumbs: 13 Small particle size crumbs: 10 | Vibration screen → Screw extruder type compression dehydrator | Suitable particle size crumbs: 55 | Single-screw expander dryer → Dryer having a vibration conveyer | $t_1$: 90 (Dryer having a vibration conveyer) | $t_1$: 80 to 200 | 0.3 | Suitable particle size crumbs: 45 | 22.7 | 157 | 0.6 | C | — |
| Comp. Ex. 5 | " | 300,000 | Large particle size crumbs: 13 Small particle size crumbs: 10 | Vibration screen → Twin-roll type compression dehydrator | Suitable particle size crumbs: 60 | Plate dryer | $t_1$: — $t_2$: 140 | $t_1$: — $t_2$: (90) to 180 | 0.6 | Suitable particle size crumbs: 60 | 20.9 | 142 | 0.7 | C | — |

TABLE 1-continued

| | Block configuration of block co-polymer[1] | Molecular weight (Mw) | Particle size distribution of crumbs prior to dehydration [wt. % of large particle crumbs and small particle size crumbs][5] | Dehydration apparatus | Particle size distribution of crumbs prior to drying [wt. % of suitable particle size crumbs] | Drying apparatus | Drying Temp. $t_1$: hot air (° C.) $t_2$: thermal conduction type heating means (° C.) | Temp. range defined in the present invention[2] | Water content (wt. %) | Particle size distribution [wt. % of suitable particle size crumbs] | Average pore diameter (μm) | Pore Volume (mm$^3$/g) | Oil-absorbing capability | Evaluation of the appearance of shaped article[3] | Productivity of dried porous crumbs |
|---|---|---|---|---|---|---|---|---|---|---|---|---|---|---|---|
| Comp. Ex. 6 | " | 100,000 | Large particle size crumbs: 2 Small particle size crumbs: 25 | Oliver filter | Suitable particle size crumbs: 95 | Agitation type dryer | $t_1$: 160 $t_2$: 160 | $t_1$: 80 to 170 $t_2$: (60) to 150 | 0.9 | Suitable particle size crumbs: 55 | 9.7 | 117 to 351 | 0.7 | Not evaluated | Intrusion of fusion bonded crumbs, low productivity |
| Comp. Ex. 7 | " | 40,000 | Large particle size crumbs: 13 Small particle size crumbs: 10 | Vibration screen | Suitable particle size crumbs: 83 | Horizontal continuous fluidized bed dryer having no thermal conduction type heating means | $t_1$: 150 $t_2$: — | $t_1$: 80 to 161 $t_2$: — | 0.4 | Not measurable | 7.3 | 155 to 240 | 0.8 | Not evaluated | Occurrence of a large amount of fusion bonded crumbs, low productivity |

Notes:
[1] In the block configuration of the block copolymer, "S" represents a polystyrene block, "B" represents a polybutadiene block, and "I" represents a polyisoprene block.
[2] The values of $t_1$ and $t_2$ are calculated by the formulae $80 \leq t_1 \leq 1.5 \times Mw/10^4 + 155$ and $1.5 \times Mw/10^4 + 45 \leq t_2 \leq 1.5 \times Mw/10^4 + 135$, respectively.
[3] With respect to the criteria for the evaluation of shaped articles, "A" means that the surface of the shaped article is smooth as a whole and the shaped article has a good appearance, "B" means that the surface of the shaped article is slightly rough, and "C" means that the surface of the shaped article is very rough or foaming is observed in the surface of the shaped article and, hence, the appearance of the shaped article is poor.
[4] The amount of crumbs which pass through a 10-mesh screen and do not pass through a 19-mesh screen.
[5] In all Examples and Comparative Examples, the amount of dehydrated wet porous crumbs which pass through a 42-mesh screen (extremely small particle size wet crumbs) was 0% by weight, based on the weight of the total mass of the wet porous crumbs.

INDUSTRIAL APPLICABILITY

The dried porous crumbs of the present invention have not only a low water content but also an advantageously high oil-absorbing capability, so that the dried porous crumbs can quickly absorb a satisfactory amount of a liquid additive, such as a softening agent and a silicone oil. Therefore, when the dried porous crumbs of the present invention are used as a modifier in the production of a molding resin composition from a thermoplastic resin and a liquid additive, such as a softening agent or a silicone oil, a shaped article having an excellent appearance can be produced by molding the molding resin composition. Further, by the method of the present invention for producing the dried porous crumbs, the dried porous crumbs having not only a low water content but also an advantageously high oil-absorbing capability can be produced effectively and efficiently.

The invention claimed is:

1. Dried porous crumbs of a hydrogenated block copolymer which is obtained by hydrogenating a block copolymer comprising (a) at least one polymer block composed mainly of aromatic vinyl monomer units and (b) at least one polymer block composed mainly of conjugated diene monomer units, said hydrogenated block copolymer having a molecular weight of 70,000 or more, said dried porous crumbs having a water content of 1% by weight or less and having an oil-absorbing capability of 1.0 or more, as determined by a method comprising immersing 10 g of the dried porous crumbs in 1 liter or more of a paraffin process oil at 25° C. under atmospheric pressure for 1 minute, taking out the resultant oil-containing porous crumbs from the oil, introducing the crumbs into a centrifugal separator and treating the oil-containing porous crumbs under 1,000 G for 3 minutes to thereby separate the oil adhering to the crumbs from the crumbs, taking out the crumbs from the centrifugal separator, measuring the weight of the crumbs and calculating the oil-absorbing capability of the dried porous crumbs by the following formula:

Oil-absorbing capability={(the weight of the oil-containing porous crumbs after the centrifugation)−(the weight of the dried porous crumbs before the immersion in the oil)}/(the weight of the dried porous crumbs before the immersion in the oil), and said dried porous crumbs having an average pore diameter of from 9.7 to 20 µm.

2. A method for producing dried porous crumbs of a hydrogenated block copolymer, said dried porous crumbs having a water content of 1% by weight or less, which comprises the steps of:

(1) providing an organic solvent solution of a hydrogenated block copolymer which is obtained by hydrogenating a block copolymer comprising (a) at least one polymer block composed mainly of aromatic vinyl monomer units and (b) at least one polymer block composed mainly of conjugated diene monomer units, said hydrogenated block copolymer having a molecular weight of 70,000 or more, (2) removing said organic solvent from said solution by steam stripping, thereby obtaining an aqueous slurry containing wet porous crumbs of said hydrogenated block copolymer, (3) subjecting said aqueous slurry to gravity dehydration or filtration dehydration to remove water from said slurry, thereby dehydrating said wet porous crumbs to an extent that the water content of the wet porous crumbs is in the range of from greater than 20% to 90% by weight, wherein the removal of water from said slurry is performed without using a mechanical compression type dehydrator or a centrifugal dehydrator, and (4) exposing the resultant dehydrated wet porous crumbs to hot air in a hot-air dryer having a thermal conduction type heating means or having no thermal conduction type heating means, to thereby dry said dehydrated wet porous crumbs, wherein the temperature of the hot air in said hot-air dryer satisfies the following relationship:

$$80 \leq t_1 \leq 1.5 \times Mw/10^4 + 155,$$

wherein $t_1$ represents the temperature (° C.) of the hot air in said hot-air dryer and Mw represents the molecular weight of said hydrogenated block copolymer, and wherein when said hot-air dryer has a thermal conduction type heating means, the temperature of said thermal conduction type heating means satisfies the following relationship:

$$t_2 \leq 1.5 \times Mw/10^4 + 135,$$

wherein $t_2$ represents the temperature (° C.) of said thermal conduction type heating means and Mw is as defined above.

3. The method according to claim 2, wherein said wet porous crumbs obtained in said step (2) have a particle size distribution wherein the amount of those crumbs which do not pass through a 2-mesh screen is 40% by weight or less, based on the weight of the total mass of said wet porous crumbs, the amount of those crumbs which pass through a 30-mesh screen and do not pass through a 42-mesh screen is 50% by weight or less, based on the weight of the total mass of said wet porous crumbs, and the amount of those crumbs which pass through a 42-mesh screen is 0.1% by weight or less, based on the weight of the total mass of said wet porous crumbs.

4. The method according to claim 2 or 3, wherein said dehydrated wet porous crumbs obtained in said step (3) have a particle size distribution wherein the amount of those crumbs which pass through a 6-mesh screen and do not pass through a 42-mesh screen is 50% by weight or more, based on the weight of the total mass of said dehydrated wet porous crumbs.

5. The method according to claim 4, wherein said dehydrated wet porous crumbs obtained in said step (3) have a particle size distribution wherein the particle sizes of all of said dehydrated wet porous crumbs are within the range of from 50 to 150% of the average particle size of said dehydrated wet porous crumbs.

6. The method according to claim 2, wherein said hydrogenated block copolymer has a molecular weight of from 90,000 to 800,000.

7. The method according to claim 2, wherein said hydrogenated block copolymer has a molecular weight of from 200,000 to 800,000.

8. The dried porous crumbs according to claim 1, which is produced by a method that comprises the steps of:

(1) providing an organic solvent solution of a hydrogenated block copolymer which is obtained by hydrogenating a block copolymer comprising (a) at least one polymer block composed mainly of aromatic vinyl monomer units and (b) at least one polymer block composed mainly of conjugated diene monomer units, said hydrogenated block copolymer having a molecular weight of 70,000 or more, (2) removing said organic solvent from said solution by steam stripping, thereby obtaining an aqueous slurry containing wet porous crumbs of said hydrogenated block copolymer, (3) subjecting said aqueous slurry to gravity dehydration or filtration dehydration to remove water from said slurry, thereby dehydrating said wet porous crumbs to an extent that the water content of the wet porous crumbs is in the range of from greater than 20% to 90% by weight, wherein the removal of water from said slurry is performed without using a mechanical compression type dehydrator or a centrifugal dehydrator, and (4) exposing the resultant dehydrated wet porous crumbs to hot air in a hot-air dryer having a thermal conduction type heating means or having no thermal conduction type heating means, to thereby dry said dehydrated wet porous crumbs, wherein the temperature of the hot air in said hot-air dryer satisfies the following relationship:

$$80 \leq t_1 \leq 1.5 \times Mw/10^4 + 155,$$

wherein $t_1$ represents the temperature (° C.) of the hot air in said hot-air dryer and Mw represents the molecular weight of said hydrogenated block copolymer, and wherein when said hot-air dryer has a thermal conduction type heating means, the temperature of said thermal conduction type heating means satisfies the following relationship:

$$t_2 \leq 1.5 \times Mw/10^4 + 135,$$

wherein $t_2$ represents the temperature (° C.) of said thermal conduction type heating means and Mw is as defined above.

9. The dried porous crumbs according to either of claim 1 or claim 8, wherein the total volume of the pores having a size within a range of from 1.8 to 57 μm is 300 mm$^3$/g or more.

10. The method according to claim 2, wherein the total volume of the pores having a size within a range of from 1.8 to 57 μm is 300 mm$^3$/g or more.

* * * * *